(12) United States Patent
Weberg et al.

(10) Patent No.: US 6,429,158 B1
(45) Date of Patent: Aug. 6, 2002

(54) THERMOSET VOLATILE MONOMER MOLDING COMPOSITIONS AND METHOD FOR MOLDING

(75) Inventors: Rolf Thomas Weberg, East Aurora; Lawrence J. Simmons, Cheektowaga; Richard Reid Gleason, Grand Island, all of NY (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 189 days.

(21) Appl. No.: 09/618,996

(22) Filed: Jul. 18, 2000

Related U.S. Application Data

(62) Division of application No. 09/099,888, filed on Jun. 17, 1998, now Pat. No. 6,203,911.

(51) Int. Cl.[7] .............................................. B32B 27/12
(52) U.S. Cl. ...................... 442/286; 442/394; 442/378; 442/232; 442/413; 428/413; 428/480; 428/482; 428/500; 523/200; 523/210; 523/211
(58) Field of Search ................................ 442/286, 394, 442/378, 232, 413; 428/413, 480, 482, 500; 523/200, 210, 211

(56) References Cited

U.S. PATENT DOCUMENTS 5,151,482 A    9/1992   Ikeda et al. .............. 526/329.7

FOREIGN PATENT DOCUMENTS

| EP | 0 214 815 A1 | 8/1986 | ............. C08F/2/02 |
| GB | 1 425 744 | 2/1976 | ........... C08F/20/14 |
| JP | 41-12116 | 7/1966 | |
| JP | 48-99283 | 12/1973 | |
| JP | 50-101481 | 8/1975 | ........... C08F/20/00 |
| JP | 56-145907 | 9/1981 | ......... C08F/220/14 |
| JP | 60-226510 | 11/1985 | ........... C08F/20/14 |
| JP | 4-114001 | 4/1992 | ............. C08F/2/02 |
| JP | 9-110496 A | 4/1997 | ........... C04B/26/06 |
| JP | 9-110497 | 4/1997 | ........... C04B/26/06 |
| JP | 9-111084 A | 4/1997 | |
| JP | 9-111085 A | 4/1997 | |
| JP | 9-111086 A | 4/1997 | |

*Primary Examiner*—Terrel Morris
*Assistant Examiner*—Norca L. Torres
(74) *Attorney, Agent, or Firm*—Andrew G. Golian

(57) ABSTRACT

A molding composition including reactive high-volatility monomeric groups, such as acrylics, at least one primary thermal initiator and at least one secondary thermal initiator is described. Molding processs using molding compositions including reactive high-volatility monomeric groups are also described.

8 Claims, No Drawings

THERMOSET VOLATILE MONOMER MOLDING COMPOSITIONS AND METHOD FOR MOLDING

This is a division of application Ser. No. 09/099,888 filed Jun. 17, 1998 now U.S. Pat. No. 6,203,911, issued on Mar. 20, 2001.

BACKGROUND OF THE INVENTION

1. Field of the Invention

This invention relates to a composition including volatile monomers, that is useful for thermoset molding and to methods for molding such compositions.

2. Description of the Related Art

Compositions for thermoset molding, also known as bulk molding compound (BMC), sheet molding compound (SMC) or thick molding compound (TMC), are well known and widely used. The compositions can be formed into shapes by compression, transfer or injection molding. During the molding process, thermally-initiated polymerization and/or crosslinking reactions take place resulting in the compositions being polymerized or "cured" in the mold cavity shape. The resulting articles that exihibit heat resistance, strength, rigidity and dimensional precision. The types of resins that are typically used include unsaturated polyesters, allyls, aminos, epoxies, phenolics and silicones. However, few of these compositions have been to be useful in producing articles/materials that have the required aesthetics and fabricability for use in decorative surfacing applications.

Acrylics, in general, have not been widely used for thermoset molding in solid surfacing applications because of the high volatility of the acrylic monomers, particularly methylmethacrylate. When introduced to preheated molds, a portion of the monomer can volatilize before the polymerization/crosslinking reactions take place, resulting in poorer physical properties and visual defects. Furthermore, conventional molding of such compounds often result in formation of internal and external voids, also related to the high volatility of the acrylic monomers.

Acrylic molding materials including a single thermal initiator are known. For example, published Japanese applications H9-110496A, H9-110497A, H9-111084A, H9-111085A, and H9-111086A disclose compositions including methyl methacrylate monomer, polymethyl methacrylate polymer, and a resin polymer powder having a core-shell structure.

The molding of thermoset molding compounds is generally accomplished via three fundamental molding techniques: compression molding, transfer molding, and injection molding. A description of these molding techniques can be found in Wright, Ralph E., *Molded Thermosets: A Handbook for Plastics Engineers, Molders, and Designers,* Hanser Publishers, Oxford University Press, N.Y., 1991.

The choice of molding technique is largely determined by the design and functional requirements of the molded article and the need to produce the molded article economically. Although each of these methods bear some resemblance to one another, each has its own design and operational requirements. Factors to consider in choosing a molding technique for making an article include, for example, article design features, mold design, molding procedures, press selection and operation, and postmolding tools and futures.

Compression molding generally employs a vertical, hydraulically operated press which has two platens, one fixed and one moving. The mold halves are fastened to the platens. The premeasured molding compound charge is placed into the heated mold cavity, either manually or automatically. Automatic charging involves use of process controls and allows wider application of the molding process. The mold is then closed with application of the appropriate pressure and temperature. At the end of the molding cycle, the mold is opened hydraulically and the molded part is removed.

Compression molding mold design consists fundamentally of a cavity with a plunger. Depending upon final part design, the mold will have various slides, ejection pins, and/or moving plates to aid in mold operation and extraction of the molded article. The mold flash gap and dimensional tolerances can be adjusted to accommodate compound characteristics and part requirements.

Transfer molding is similar to compression molding except for the method in which the charge is introduced into the mold cavity. This technique is typically applied to multiple cavity molds. In this method, the charge is manually or automatically introduced into a cylinder connected to the mold cavities via a system of runners. A screw can be employed to introduce the material into the transfer cylinder. A secondary hydraulic unit is used to power a plunger which forces the molding compound through the runners and into the mold cavities of the closed mold. A vertical, hydraulic press then applies the needed pressure at the appropriate temperature to compression mold the intended part. Transfer mold design is somewhat more complicated than that of compression molds due to the presence of the transfer cylinder and runners and due to internal mold flow considerations, but general attributes are similar. Use of a shuttle press can be employed to allow encapsulation of molded-in inserts.

In general, injection molding is closely related to transfer molding except that the hydraulic press is generally horizontally oriented, and the molding compound is screw injected into the closed mold cavities via a sprue bushing and a system of gates and runners. Pressure is then applied at the appropriate temperature to cure the part. The mold is opened for part ejection and removal, the mold is closed, and the next charge is injected by the screw. This thermoset molding technique has a significant advantage in cycle time versus the other techniques listed above. As such, it finds widespread use in multicavity molding applications. Injection mold designs are yet more complex and require special attention to internal mold flow of the molding compound. In an extended application of injection molding, a vertically oriented shuttle press can be employed to allow encapsulation of molded-in inserts.

In summary, the compression molding technique is primarily a semiautomatic method which typically exhibits the least part shrinkage and the highest part density, but has the longest cycle time, is limited in ability to produce molded-in inserts, is limited in complexity of mold design, and requires the most work to finish the molded product (flash removal). Transfer molding and injection molding are semiautomatic and automatic methods, respectively, with shorter method cycle times, excellent operability in producing molded-in inserts, and less work in finishing molded parts. Both techniquess typically exhibit a lower part density and increased shrinkage versus compression molding.

Despite process differences in the molding techniques, thermoset molds have several common features in their design and use. These molds are often run isothermally; an optimal molding temperature is maintained throughout the molding cycle. For cycle time reasons, temperature cycling of molds is not common in high productivity applications. High productivity molds are designed with internal channels for circulating hot oil or with internal electric heating elements for faster mold heating response. If needed, cooling channels (oil or water) can be included. Molds can also be heated and cooled by contact with heated/cooled platens; this is representative of long cycle, low volume production. Finally, typical thermoset molding cycles involve immediate application of the final molding pressure although pressure profiles (gradual application of pressure to a final selected molding pressure later in cure cycle) are used in various situations.

SUMMARY OF THE INVENTION

This invention is directed to a molding composition which is suitable for thermoset molding. The composition includes at least one volatile monomer reactive material. The composition also comprises at least one viscosity builder and at least two thermal initiators having different temperatures of activation. Unless otherwise stated, the weight percent value given is based upon the total weight of the molding composition.

Specifically, the composition comprises:
  (a) from about 10 to about 25% by weight of a liquid polymerizable material including at least one volatile monomer reactive material;
  (b) at least one viscosity builder;
  (c) at least one primary thermal initiator having a primary thermal initiator ten-hour half-life temperature; and
  (d) at least one secondary thermal initiator having a secondary thermal initiator ten-hour half-life temperature of at least about 5° C. greater than the primary thermal initiator ten-hour half-life temperature;
  (e) optionally at least one non-crosslinked polymer;
  (f) optionally at least one filler;
wherein at least about 0.05% by weight, is one or more crosslinking agents.

The invention is further directed to methods for making an article from the molding composition described above. The method used generally depends on the viscosity of the composition and the geometry of the mold. The method also depends on the type of molded article to be made, i.e., a solid part or a part in which a non-reactive insert, or core, is encapsulated or coated.

In a first embodiment of the method, the composition is molded at a single temperature and pressure. In general, the mold charge unit(s) is heated in a closed mold to a temperature sufficient to cause the secondary thermal initiator to pass through about 3–10 half lives within about ten minutes or less, and held at a pressure sufficient to maintain the internal and surface integrity of the mold charge, preferably from about 500–1500 psi (35–105 kg/cm$^2$). This embodiment is particularly useful when one of two preferred conditions is met: (a) the mold has a flash gap tolerance not greater than about 130 microns; or (b) the reactive composition has a spiral flow length no greater than about 150 cm, preferably no greater than about 100 cm.

In a second embodiment of the method, the composition is molded using a dual temperature profile at a single pressure. In general, the mold charge unit(s) is placed into a mold cavity of a mold having an initial mold temperature that is no greater than about 10° C. less than the boiling point of the most volatile component. Preferably, the mold is preheated to reduce cycle time. More preferably, the mold is first heated to an initial temperature that is at least about 50° C. The mold is then closed and a pressure is applied to a molding pressure sufficient to maintain the internal and surface integrity of the mold charge, preferably about 500–1500 psi (35–105 kg/cm$^2$). The mold temperature is then increased to a temperature sufficient to cause the secondary thermal initiator to pass through about 3–10 half lives within about ten minutes or less. The mold is then cooled to the original temperature prior to removal of the molded article. For this embodiment also, the method is particularly useful when one of two preferred conditions is met: (a) the mold has a flash gap tolerance not greater than about 130 microns; or (b) the reactive composition has a spiral flow length no greater than about 150 cm, preferably no greater than about 100 cm. In addition, this method is particularly useful for intricate mold patterns requiring multiple charges of molding composition, for molded articles having at least one high-gloss surface, and also for encapsulating non-reactive core materials. Furthermore, it can be useful for injection molding.

In a third embodiment of the method, the composition is molded at a constant temperature and with a dual pressure profile. In general, the thermoset molding composition is placed in the mold cavity of a mold that is preheated to a temperature sufficient to cause the secondary thermal initiator to pass through about 3–10 half lives, preferably within about ten minutes or less. An initial molding pressure sufficient to fill the mold with the mold charge, preferably of from about 100–500 psi (21 to 35 kg/cm$^2$) is applied and maintained for a time sufficient to seal the flash gap, preferably for about 30–90 seconds. The pressure is then increased to a selected molding pressure sufficient to maintain the internal and surface integrity of the mold charge, preferably about 500–1500 psi (35–105 kg/cm$^2$). The mold temperature and a final molding pressure are maintained for a time sufficient for the secondary thermal initiator to complete from about 3–10 half lives. In general, this method is useful for lower viscosity compositions where there is a need to flow in complex parts.

In a fourth embodiment of the method, the composition is molded with a dual temperature profile and dual pressure profile. In general, the molding composition is first placed in the mold, which has an initial mold temperature of no greater than about 10° C. less than the boiling point of the most volatile component. The mold is preferably preheated to reduce cycle time. More preferably, the mold is preheated to an initial mold temperature of at least about 50° C. The pressure is applied to fill the mold with the mold charge, preferably to about 300–500 psi (21 to 35 kg/cm$^2$) and maintained for a time sufficient to seal the flash gap, preferably for about 30–90 seconds. Preferably at the same time the mold is closed (again, to reduce cycle time), the mold is heated to a temperature sufficient to cause the secondary thermal initiator to cycle through from about three to about ten half lives within about ten minutes or less. The pressure is then increased to a selected molding pressure sufficient to maintain the internal and surface integrity of the mold charge, preferably about 500–1500 psi (35–105 kg/cm$^2$). The mold temperature and a final molding pressure are maintained for a time sufficient for the secondary thermal initiator to complete from about 3–10 half lives. In addition, this method is particularly useful for intricate mold patterns requiring multiple charges of molding composition, for molded articles having at least one high-gloss surface, and also for encapsulating non-reactive core materials. Furthermore, it can be useful for injection molding.

The invention is further directed to a molded articles made from the composition described above.

The invention itself, together with further objects and attendant advantages, will best be understood by reference to the following detailed description.

DETAILED DESCRIPTION OF THE PREFERRED EMBODIMENTS

The Molding Composition

The compositions of the invention are useful for forming polymeric articles by thermoset molding processs. The term "article" is intended to include both sheet materials and three-dimensional parts. The article can have a non-reactive core or insert encapsulated or coated by the thermoset molding composition. By "non-reactive" is meant that the material does not participate in the thermoset reactions during the molding process, although some interactions may take place at or within the surface of the non-reactive insert. (For example, some of the components of the molding composition may permeate into the outer surface layer of the insert and react during the molding process so that a gradient adhesive layer with the outer insert layer is formed.) The article can also have a layered structure in which the molding composition is adjacent to one surface of a sheet or structure made from a different composition.

The molding composition of the present invention are at least 95% cured when heated in a closed mold at a temperature of about 100° to about 145° C. for about 10 minutes or less. By "95% cure" it is meant that less than 5% by weight of the monomer (based upon the weight of the liquid polymerizable material) remains unreacted.

Liquid Polymerizable Material

The liquid polymerizable material is a liquid starting material. By "liquid" is meant that the material is fluid at room temperature. The Brookfield viscosity of the liquid can be as high as 20,000 cps, as measured at 40° C. The liquid polymerizable material may include one or more of the following: (a) at least one volatile monomer reactive material; (b) at least one nonvolatile monomer reactive material, and (c) at least one oligomeric reactive material. The present invention is particularly useful where the liquid polymerizable material includes at least one volatile monomer reactive material, and optionally, (a) at least one nonvolatile monomer reactive material, and/or (b) at least one nonvolatile oligomeric reactive material.

It will be appreciated that the choice of liquid polymerizable material(s) will depend to some extent on the desired properties of the final molded article. For example, if adhesion to a hydrophilic substrate is desired, an acrylic material with acid or hydroxyl groups can be used. For flexibility, (meth)acrylates with lower $T_g$, such as butyl acrylate, can be used. For thermal stability, it is preferred that acrylates be used in combination with methacrylates. For enhanced hardness, it is preferred that high $T_g$ (meth)acrylate functional oligomerbe used.

(a) Volatile Monomer Reactive Material

By "volatile monomer reactive material," it is meant a low-boiling point monomeric material including at least one site of unsaturation that is co-polymerizable in a radical-initiated addition polymerization reaction. In general, useful volatile monomer reactive materials have boiling points of less than the highest molding temperature, measured at atmospheric pressure (1 atm). The present invention is especially useful for molding compositions including at least one volatile monomer reactive material having a boiling point of less than about 110° C. Suitable volatile monomer reactive materials can include, for example, monomers having at least one acrylic group, monomers having at least one vinyl group, monomers having both acrylic and vinyl groups, substituted butadienes or combinations thereof. Examples of volatile monomer reactive materials including at least one acrylic group includes methyl (meth)acrylate and ethyl (meth) acrylate, where the term "(meth)acrylate" refers to acrylate, methacrylate and combinations thereof. Examples of volatile monomer reactive materials including at least one "vinyl group" includes acrylonitrile, methacrylonitrile, and vinyl acetate.

Other useful liquid polymerizable materials include those that polymerize under the same conditions as the volatile monomer reactive materials. In one embodiment, these other liquid polymerizable material is preferably fully miscible with the volatile monomer reactive material. Examples of suitable liquid polymerizable materials include acrylics, allyls and other vinyl monomers, siloxanes, and silanes. Combinations of liquid polymerizable materials can also be used.

(b) Nonvolatile Monomer Reactive Material

Nonvolatile monomer reactive materials can generally be used to adjust physical and/or the aesthestic properties of the molded article. One type of suitable non-volatile monomer reactive material is an ester of acrylic or methacrylic acid. The ester is generally derived from an alcohol having 3–20 carbon atoms. The alcohols can be aliphatic, cycloaliphatic or aromatic. The ester may also be substituted with groups including, but not limited to, hydroxyl, halogen, and nitro. Representative (meth)acrylate esters include butyl (meth)acrylate, 2-ethylhexyl (meth)acrylate, glycidyl (meth)acrylate, cyclohexo(meth)acrylate, isobornyl(meth)acrylate, siloxane (meth)acrylate, and the like. Acrylic and methacrylic acid can also be used. Other types of reactive acrylic materials include acrylic functionalized materials such as, for example, urethane (meth)acrylates formed by (meth)acrylic functionalization of urethane oligomers or by in situ reaction of oligomeric isocyanates with (meth)acrylic residues; epoxy (meth)acrylates, such as the mono- and di(meth)acrylates of bisphenol A epoxy resins; (meth)acrylate functionalized unsaturated polyester oligomers and resins. By "acrylic functionalized material" it is meant any compound that has at least one reactive (meth)acrlic group appended on the material. Combinations of reactive acrylic materials can also be used.

(c) Oligomeric Reactive Material

An oligomeric material is "reactive" when the material physically associates or chemically reacts with any other component(s) in the molding composition. Oligomeric reactive materials can include oligomers of any of the (a) and/or (b) monomers described above, urethanes, unsaturated polyesters, epoxies and combinations thereof. Preferably, the oligomeric reactive material is incorporated into the polymerized material making up the molded article during the molding process.

In thermoset molding, the final molded article is frequently smaller than the mold cavity due to volume contraction during the polymerization process. The difference between the mold dimension and the dimension of the final molded article, usually measured along the longest edge, is referred to as shrinkage. In the molding industry, it is desirable to minimize and characterize shrinkage in order to facilitate mold design and accurately predict and reproduce part dimensions.

To minimize overall shrinkage in the formation of the molded article, it is preferred that the amount of volatile monomer reactive material and nonvolatile monomer reactive material, when used, is no greater than about 25% by weight, preferably no greater than about 18% by weight, based on the total weight of the molding composition. Preferably, a minimum amount of (nonvolatile and/or volatile) monomer reactive material(s) is present to provide sufficient liquid viscosity to facilitate processability. More preferably, this minimum amount is about 5% by weight, most preferably about 10% by weight, based on the total weight of the molding composition. Oligomeric reactive materials are also used to replace the polymerizable monomer (i.e., the nonvolatile monomer reactive material and the volatile monomer reactive material) as a means to reduce overall shrinkage of the molded article.

The present invention is particularly useful for a molding composition wherein at least about 1% by weight of the liquid polymerizable material is a volatile monomer reactive material; more particularly useful where at least about 20% by weight of the liquid polymerizable material is a volatile monomer reactive material; most particularly useful where at least 50% by weight of the liquid polymerizable material is a volatile monomer reactive material.

The total amount of liquid polymerizable material in the molding composition is generally present in an amount of from about 10 to about 25% by weight, based on the total weight of the molding composition. Preferably, the liquid polymerizable material is from about 10 to about 20% by weight of the total molding composition.

Non-crosslinked Resin Polymer

The molding composition of the present invention optionally includes at least one non-crosslinked resin polymer. Non-crosslinked resin polymers of the present invention can be reactive, nonreactive or a combination thereof. A non-crosslinked resin polymer is "reactive" when the polymer physically associates or chemically reacts with any other component(s) in the molding composition.

In a preferred embodiment, the reactive non-crosslinked resin polymers are also incorporated into the polymerized material making up the molded article during the molding process. The term "non-crosslinked" as used herein refers to polymers that are linear, branched, blocked or combinations thereof, that, as a starting material prior to introduction to the molding composition have chains without linkages between the chains. The non-crosslinked resin polymer contributes to the strength and other physical properties of the molded article, and lowers the amount of liquid polymerizable material needed.

The non-crosslinked polymer can either be soluble or insoluble in the liquid polymerizable material. The combination of the soluble non-crosslinked polymer dissolved in the liquid polymerizable material is generally referred to as a "sirup". Suitable polymers include, are but not limited to, homopolymers and copolymers made from any of the monomers or oligomers listed above as liquid polymerizable material. It is understood that any polymeric material can be used in the present invention as a non-crosslinked resin polymer, limited only by the desired property of the final molded article.s.

Preferably, the polymer has a weight average molecular weight in the range of about 30,000 to about 200,000, more preferably from about 60,000 to about 200,000. In one embodiment, the polymer can be added in the form of beads having a median (d50) particle size in the range of from about 100 to about 300 microns and mixed to dissolve. Beads having smaller particle sizes can also be used. Preferred non-crosslinked polymers are the homopolymers and copolymers of (meth)acrylate esters.

The non-crosslinked polymer(s), when present, is generally present in an amount of from about 1 to about 20% by weight, based on the total weight of the molding composition; preferably about 2 to about 10% by weight.

Fillers

The molding composition of the present invention optionally includes at least one filler. Suitable types of fillers useful in the present molding composition include, for example, mineral fillers, decorative fillers, and functional fillers.

The mineral filler increases the strength of the final molded article. It will be understood, that in addition to strength, the mineral filler can provide other attributes to the molded article. For example, it can provide other functional properties, such as flame retardance, or it may serve a decorative purpose and modify the aesthetics. Any mineral fillers known in the field of acrylic solid surfaces can be used in the present molding composition. Some representative mineral fillers include alumina, alumina trihydrate (ATH), alumina monohydrate, Bayer hydrate, silica including sand or glass, glass spheres, magnesium hydroxide, calcium sulfate, calcium carbonate, barium sulfate, and ceramic particles. Combinations of mineral fillers can also be used. Furthermore, these mineral fillers can be optionally coat-treated with coupling agents such as silane (meth)acrylate such as Silane Methacrylate A-174 available from OSI Specialties (Friendly, W. Va.) or Zelec® MO available from E. I. du Pont de nemours and Company (Wilmington, Del.). The mineral filler is generally present in the form of small particles, with an average particle size in the range of from about 5–200 microns.

The nature of the mineral filler particles, in particular, the refractive index, has a pronounced effect on the aesthetics of the final molded article. When the refractive index of the filler is closely matched to that of the liquid polymerizable material after polymerization, the resulting molded article has a translucent appearance. As the refractive index deviates from that of the polymer matrix after polymerization, the resulting appearance is more opaque. The index of refraction of ATH is very close to that of poly methylmethacrylate (PMMA), and frequently ATH is a preferred filler for PMMA systems. For other polymer/filler systems, the refractive indices can be adjusted to provide the desired appearance.

The mineral filler, when present, is generally present in an amount of from about 10 to about 75% by weight, based on the total weight of the molding composition; preferably about 40 to about 70% by weight.

The molding composition can optionally include decorative fillers. Such fillers, although they may have a minor effect on physical properties, are present primarily for aesthetic reasons. Examples of suitable decorative fillers include larger particles of unfilled and filled crosslinked or uncrosslinked polymeric material. Such materials generally have a particle size of from about 325 to about 2 mesh (0.04–10.3 mm in greatest average dimension) and can be, for example, pigmented PMMA particles filled with ATH. Alternatively, very large particle size fillers can be used. The decorative filler particle sizes can be greater than the mold cavity in the Z-dimension so that they can be crushed upon application of pressure to give an interesting fractured aesthetic. Furthermore, decorative filler pieces significantly large in the X, Y-plane of the mold cavity (e.g., 1 to 6 inches) can be encapsulated but leaving one side exposed to give an interesting aesthetic. As the particle size and amount of the large polymeric particle filler is increased, it is generally necessary to adjust the amount of viscosity builder present to maintain consistent viscosity of the molding composition. Other types of decorative fillers include: pigments and dyes; reflective flakes; metal particles; rocks; colored glass; colored sand of various sizes; wood products such as fibers, pellets and powders; and others. The decorative filler can be present in an amount of from 0 to about 80% by weight, based on the total weight of the molding composition; more typically, about 1 to about 25% by weight The molding composition can optionally include functional fillers. Such fillers impart additional special properties for specific applications. Examples of such functional fillers include flame retardants, antibacterial agents, and others known in the art. The functional fillers, when used, are present in an amount sufficient to be effective, but generally no greater than about 25% by weight, based on the total weight of the molding composition.

The total amount of fillers present in a molding composition is generally from about 1–80% by weight, and preferably from about 40–70% by weight, based upon the total weight of the composition.

Viscosity Builders

The molding composition of the invention includes at least one viscosity builder. The functions of the viscosity builder include to quickly and irreversibly reach a preferably stable viscosity of the molding composition during the mixing process and to stabilize and maintain the viscosity of the molding composition during the mixing process in a way that does not interfere with the polymerization reaction during the molding process. The viscosity builder further maintains the viscosity of the molding composition until the molding composition is used in the molding process.

Viscosity builders useful in the present invention increases viscosity of the molding composition through physical and/or chemical interactions with other components in the molding composition. Viscosity builders useful in the present invention include (1) ionic crosslinkers, (2) chemical crosslinkers, (3) setting agents, (4) thickeners, and combinations thereof. Of course, the suitable viscosity builder is functional at the mixing temperature for the molding composition (which temperature is preferably about 10–60° C., more preferably about 20–40° C.).

Preferably, the total amount of viscosity builder ranges between about 0.1% and about 25% by weight.

(1) Ionic Crosslinkers

Ionic crosslinkers generally facilitate ionic interaction of a metal ion with, for example, acid or hydroxyl residues. Examples of useful ionic crosslinkers include magnesium hydroxide (MgOH) and various zinc salts.

(2) Chemical Crosslinkers

Chemical crosslinkers generally facilitate chemical condensation reactions such as, for example, condensation of polyisocyanates with hydroxyl residues.

(3) Setting Agents

Setting agents generally facilitate physical imbibition of liquid components into solid materials. The setting agent useful in the present invention can be (a) an organic polymeric fiber, (b) a fine particulate polymeric material, (c) a polymer/filler composite, or combinations thereof. Suitable setting agents are compatible with the liquid polymerizable material and results in rapid increased viscosity in the molding composition upon mixing. By "rapid increased viscosity", it is meant that the viscoisty of the molding composition increases within about 5 hours or less, preferably within about 1 hour or less. In a preferred embodiment, the compatible setting agent meets one of two conditions: (1) the setting agent does not form a separate phase in the molding composition; (2) if the setting agent does form a separate phase, and has a refractive index sufficiently close to that of the liquid polymerizable material after polymerization so that the separate phase is not visible in the molded article. In general, the setting agent is a high $T_g$ polymeric material which absorbs or imbibes the components of the liquid polymerizable material.

Suitable monomer-absorbing organic polymeric fibers (a) include, for example, polyester fibers that provide improved process latitude by absorbing polymerizable monomer and subsequently sealing the flash gap of the mold quickly.

Fine particle polymeric materials are generally prepared directly by either suspension or emulsion polymerization. Suspension polymerization is a generally practiced technique which generally affords polymer beads having a particle size in the range of 80–130 microns. The particles are made of many polymer chains with weight average molecular weights generally no greater than 100,000. The polymer particles are solid and non-porous. Emulsion polymerization is a well-known practiced technique which typically affords a water-borne dispersion of particles, generally referred to as primary particles, between 0.2 and 2 microns in diameter. The particles generally are made of only one polymer chain with weight average molecular weights in excess of 500,000 and generally greater than one million. The polymer particles can be porous, depending upon the drying technique.

Polymeric materials suitable as setting agents (b) are generally made by emulsion polymerization. Aqueous dispersions of polymers prepared by emulsion polymerization, typically referred to as latices, can be dried using a variety of techniques, such as freeze-drying, drum drying and spray drying. Each technique has its own requirements regarding temperature of operation and rate of water removal. As the water is removed, the polymer particles tend to agglomerate. As this is accompanied by increasing amounts of heat, the polymer particles will tend to coalesce, losing their individual identity and forming a larger particle with reduced surface area. Furthermore, if the drying method does not employ severe temperatures, the level of coalescence can be minimized to greatly increase the available surface area morphology of the polymer particle. The resulting high surface area, porous polymer particle with a size ranging from 2–150 microns offers an ability to imbibe free monomer quickly to rapidly build viscosity to a stable and reproducible level.

Dried latex particles with a median (d50) particle size of from about 30 to about 150 microns have been found to be the most effective. Furthermore, it is also preferred that the agglomerate particles have morphologies that are friable, thus readily separating into smaller particles and thereby providing greater surface area for rapid liquid imbibition.

Emulsion polymerization is a well-known technique and has been described in, for example, Sanderson, U.S. Pat. No. 3,032,521, Hochberg, U.S. Pat. No. 3,895,082, and Fryd et al., U.S. Pat. No. 4,980,410. The emulsion polymerization process can be controlled to produce polymeric particles having a molecular weight (weight average) in excess of one million. In general, polymeric particles having weight average molecular weights in the range of about 500,000 to about 2,000,000 are useful in the compositions of the invention. For the compositions of the invention, the polymeric setting agent should have a $T_g$ greater than 50° C.; preferably greater than 80° C.; most preferably greater than 90° C.

Examples of suitable polymers that can be used as a setting agent include homopolymers and copolymers of: acrylic acid; methacrylic acid; (meth)acrylate esters of alcohols having 1–20 carbon atoms; vinyl ethers; vinyl esters; acrylonitrile, methacrylonitrile; acrylamide; methacrylamide; styrene, including substituted styrenes; butadiene. Combinations of polymers can also be used. A preferred type of setting agent is a (meth)acrylic polymer or copolymer.

The setting agent particles can also have core-shell structure in which the monomers polymerized to form the core of the particle differ from those polymerized to form the shell. Such core-shell particles have been described in, for example, Fryd et al., U.S. Pat. No. 4,726,877. The shell can be crosslinkable, functioning as an additional crosslinking agent in the molding composition.

Polymer particle setting agents suitable for the compositions of the invention, are available commercially as PARALOID(R) K-120N-D, 99–100% poly (methylmethacrylate/ethylacrylate from Rohm and Haas (Philadelphia, Pa.); Kane Ace FM-25, 98% poly (methylmethacrylate/acrylic) core-shell copolymer from Kaneka Texas Corp. (Pasadena, Tex.); Elvacite(R) 2896 and Elvacite(R) 2041, both 99% polymethylmethacrylate from ICI Acrylics, Inc. (Wilmington, Del.).

Another type of setting agent is a polymer/filler composite (c). One such composite setting agent is prepared by spray drying an aqueous latex dispersion with a mineral filler such as ATH. The resulting dry powder is comprised of a filler particle with a thin coating of coalesced latex. This structure affords a high surface area polymer. It also offers an advantage in that the setting agent polymer is predispersed in the mixture by its association with the filler surface, which aids in method design and helps to avoid material inhomogeneities in the molding compound resulting from incomplete mixing and wetting of the polymer particle setting agent. Such composite materials have been described in, for example, Sasaki et al., U.S. Pat. No. 4,678,819.

A second composite setting agent is derived from the dust generated during the milling, sawing, and sanding of filled polymer decorative solid surface materials. Such dust generally has particles with particlesizes in the range of from about 5 to about 250 microns. A median particle size of about 60 microns has been found useful.

Preferably, the molding composition includes from about 2% to about 20% by weight of setting agents.

(4) Thickners

Thickeners generally facilitate an increase in viscosity through the building of structure between thickener and filler particles. Examples of suitable thickeners include silicas and structured silicas, and zeolites.

Primary Thermal Initiator

The primary thermal initiator (primary initiator), when heated, generates free radicals which initiate the polymerization reactions. The general function of the primary thermal initiator is to facilitate the polymerization reaction in the molding composition during the initial period, preferably the first minute, of the reaction. Factors that may be used in choosing the type of initial and secondary thermal initiators include the intended cycle time, mold temperature and the ceiling temperature of the volatile reactive monomer(s). By "ceiling temperature" it is meant the temperature at which the polymerization and depolymerization of the monomer(s) reaches equilibrium. In addition, in general, the lower the half-life temperature of the thermal initiator, the shorter the shelf life of the molding composition. Thus, it is preferred that the primary thermal initiator have a ten-hour half-life temperature in the range of from about 40 to about 80° C. The "ten-hour half-life temperature" is a conventional measure of initiators which indicates the temperature at which one-half of the initiator will undergo decomposition to provide initiating radicals within ten hours. The thermal initiators are generally either peroxy compounds or azo compounds. Illustrative compounds include t-butylperoxyneodecanoate which has a ten-hour half-life temperature of about 48° C., available commercially as Lupersol®10M 75 from Elf Atochem, King of Prussia, Pa.); and t-butylperoxypivalate which has a ten-hour half-life temperature of from about 58° C., (available commercially as Lupersol®11 from Elf Atochem). An azo initiator is commercially available as Vazo®52 from E. I. du Pont de Nemours and Company (Wilmington, Del.) which has ten-hour a half-life temperature of 52° C. The primary thermal initiator is generally present in an amount of from about 0.01 to about 5%, preferably from about 0.02 to about 1.0% by weight, based on the total weight of the molding composition.

Secondary Thermal Initiator

The general function of the secondary thermal initiator (secondary initiator) is to complete the polymerization reaction(s) after the primary thermal initiator is essentially depleted. The ten-hour half-life temperature of the secondary thermal initiator is preferably at least about 5° C., more preferably about 8–20° C. greater than the ten-hour half-life temperature of the primary thermal initiator. Preferably, the ten-hour half-life of the secondary initiator is in the range of from about 60 to about 120° C., more preferably about 60–80° C. In most cases, the secondary thermal initiator is an azo compound. An illustrative compound is 2,2-azobis (methylbutyronitrile) which as a ten-hour half-life temperature of from about 67° C., commercially available as Vazo®67 from E. I. du Pont de Nemours and Company (Wilmington, Del.). The secondary thermal initiator is generally present in an amount of from about 0.001 to about 1%, preferably from about 0.005 to about 0.5% by weight, based on the total weight of the molding composition.

The amount of primary and secondary thermal initiators used in the molding composition are often dependent upon the desired cycle time and completeness of polymerization in the molding process. In addition, the typical mole ratio of primary thermal initiator to the secondary thermal initiator ranges from about 3 to about 6 preferably from about 5 to about 6.

Crosslinking Agents

The composition of the invention includes an effective amount, preferably at least about 0.05% by weight, based on the total weight of the composition, of at least one crosslinking agent. The crosslinking agent is generally a multifunctional material having more than one reactive group that reacts with the liquid polymerizable material and other reactive materials (such as the reactive non-crosslinked resin polymer) at the molding temperature. The reactive group can be one which copolymerizes with the liquid polymerizable material, such as a polymerizable ethylenically unsaturated group. The reactive group can also be one which reacts with a side chain or residue of the liquid polymerizable material after polymerization, such as a hydroxyl, carboxyl, isocyanate or epoxy group. The reaction of the multifunctional reactive material forms a crosslinked network with the liquid polymerizable material.

Crosslinking resins can be used as crosslinking agents, such as epoxies, novolacs, amino resins, and (meth) acrylated resins.

The crosslinking agent can be a liquid polymerizable material, generally a multifunctional monomer or oligomer. A preferred class of crosslinking agents is the (meth)acrylate esters of polyols. Some representative examples include ethylene glycol di(meth)acrylate, hexanediol di(meth) acrylate, trimethylolpropane tri(meth)acrylate, pentaerythritol tri(meth)acrylate, dipentaerythritol tetra(meth)acrylate, and the like. Other suitable types of crosslinking agents include divinyl compounds, such as divinyl ethers, allyl (meth)acrylate, urethane di- and poly-(meth)acrylates.

The crosslinking agent can be a non-crosslinked polymer having multiple reactive groups. The reactive groups can be pendant to or in the main chain of the polymer.

The crosslinking agent can be a setting agent having multiple reactive groups. The reactive groups can be present throughout the setting agent polymer, or they can be present only at the surface of the setting agent particle, for example, in the shell polymer(s) of a core-shell microgel setting agent.

It is understood that the crosslinking agent can also be any combination of the above-described liquid polymerizable material, non-crosslinked polymer and setting agent or a material outside of these described material groups. It is further understood that a component useful in the present invention that functions as a crosslinking agent at the molding temperature can also function as a viscosity builder at the mixing temperature when the component has reactive groups with different reactivities (e.g., one group reacting at the mixing temperature, while a separate group reacting at the molding temperature). For example, (1) a useful component may contain two isocyanate reactive groups wherein one isocyanate group is blocked at the mixing temperature and becomes unblocked at the molding temperature; (2) a useful component may contain isocyanate and epoxy reactive groups; and (3) a useful component may contain isocyanate and acrylic reactive groups.

The amount of crosslinking agent present often affects the physical properties and the polymerization cure time of the molded article. Increased levels of crosslinking agent improve the hot strength of the article, i.e., the structural integrity of the article when removed from the mold while still hot. With lower levels of crosslinking agent, the molded aticle should be cooled before removing it from the mold because it is still too flexible and flowable when hot. Generally, increasing the level of crosslinking agent also increases the brittleness of the molded article and can lower the impact strength and toughness. The final level of crosslinking agent is determined by balancing these and other desired properties. The nature of the crosslinking agent can have a significant impact on the physical properties of the molded article. Combinations of crosslinking agent material can be optimized to offer desired hot strength without severely impacting physical properties. The amount of crosslinking agent depends upon the equivalent weight of the crosslinking agent and the intended use of the molded article. By "equivalent weight" it is meant the molecular weight of the crosslinking agent divided by the number of reactive groups on the crosslinking agent. In general, the crosslinking agent is present in an amount of at least about 0.05% by weight, based on the total weight of the molding composition, preferably at least about 0.2% by weight; more preferably at least about 1% by weight.

Other Ingredients

The molding composition can optionally include fiber reinforcement for additional impact, flexural and tensile strength. Useful forms of fiber include, free fibers, woven or nonwoven mats, cloth or veils and combinations thereof. The fibers can be polyester, polyaramid, sized or unsized glass, carbon fibers, or liquid crystal fibers. Monomer absorbing fibers, such as those useful as setting agents, are generally not visible in the molded article. Polyaramid and carbon fibers provide toughness as well as method latitude, but generally are visible. Glass fibers provide method latitude and aesthetics, but can also cause staining. The fibers can be prewet with liquid polymerizable material prior to adding to the composition. The nonwoven or woven fiber mats can also be embedded as a surface treatment on one or both sides of the molded article. Alternatively, the fiber mat can be encapsulated in the molded article. The fibers are generally present in an amount of up to about 50% by weight, based on the total weight of the molding composition. In one embodiment, the fibers are present in an amount of about 5–10% by weight.

The molding compositions can also contain coupling agents. Coupling agents generally have dual functionality: one end having a polymerizable group which can copolymerize with the liquid polymerizable material; the other end having a group which complexes with or has an affinity for the particulate mineral filler(s). Thus, coupling agents can be used as an aid in wetting the particulate filler with the liquid polymerizable material. For (meth)acrylate/ATH systems coupling agents which are particularly useful are those having (meth)acrylate functionality and a phosphate or silane group. These coupling agents can be added as a pre-treatment to mineral fillers during the production method, as referred to in the previous section describing fillers. Alternatively or additionally, these coupling agents can be added in situ to the molding composition. Examples of commercially available coupling agents include Zelec® MO from E. I. du Pont de Nemours and Company (Wilmington, Del.) and as A-174 from Osi Specialties, a subsidiary of Witco (Friendly, W. Va.). In general, up to about 0.5% by weight of the total molding composition can be coupling agents.

Other additives which can be present in the molding composition include internal mold release agents such as zinc stearate, the sodium salt of dioctyl sulfosuccinate (such as Aerosol™ OT-S Surfactant (70% solution sodium salt of dioctyl sulfosuccinate in petroleum naphtha) available from Cytec Industries Incoporated, West Patterson, N.J.), zinc octoate, and silicone oils and (meth)acrylate fuctionalized silicones and siloxanes; wetting agents; surfactants; antioxidants; plasticizers and other components known to be used in polymeric materials.

For thermoset molding, the compositions should have a consistency similar to bread dough, or even thicker. It is difficult to measure viscosity reliably for materials this thick. A better measure of this is the spiral flow length. The spiral flow length given herein are values determined by the spiral flow length measurement technique described in the Examples.

For thermoset molding, the composition preferably has a spiral flow length of less than about 40 inches (102 cm) for an isobaric process. A spiral flow length of greater than about 40 inches (102 cm) is preferred for a process involving a pressure profile. Of course, the higher the viscosity, the shorter the spiral flow length.

Molding Composition Preparation

The molding compositions can be prepared, in general, simply by mixing the components at high shear. This is generally accomplished in a device known as a kneader. For batch methods a kneader/extruder, a twice-screw extruder or the like can be used. For continuous methods, a Buss or List kneader can be used. Such mixers are well known in the food industry and compounding industry.

In general, the components are mixed in order in one of two sequences. In one sequence, all the liquid components are first mixed together. To this is added the mineral filler(s) (if present), the setting agent(s) (if present), and the thickener(s) (if present), which can all be premixed. Finally, all the other components can be added. In a second sequence, the mineral filler and the setting agent are first mixed together. To this is added the liquid components individually. Finally, all the other components are added. The choice of mixing sequence is dependent upon the nature of the process requirements.

It is understood that other mixing orders can be used to prepare the molding composition. It is further understood that the mixing temperature should be maintained to prevent the onset of polymerization. Preferably, the mixing temperature is maintained between about 10–60° C., more preferably, between about 20–40° C.

The composition, as formed, is suitable for molding immediately, even though the viscosity may continue to increase slightly over time (e.g., about 24 hours).

Post-Mixing Compound Treatment, Packaging, and Storage

Once the molding compound is prepared by the suitable mixing or compounding method, it can be packaged and delivered either in bulk form or as a preshaped charge. Preshaping is generally done either by compressing a measured amount of the molding compound in an unheated mold designed to provide a charge in the proper shape or by consolidating and extruding the molding compound through a specific profiling die and cutting the profile into measured lengths consistent with the needed charge weight or injection feeder design. The latter can be continuously fed from a continuous mixer, if needed. The molding compound (bulk form or preshaped charge) is then packaged in an impermeable plastic bag. The sealed bags are then packaged in rigid containers and stored or shipped, preferably under refrigeration.

In an extension of the extruded profiling method above, the molding compound can be continuously extruded through a slit die, in between two polymer film sheets and into a calendering system to produce a continuous SMC profile. The compound is rolled up and sealed for storage or shipping.

Molding compound may be stored at refrigerated temperatures until use in order to preserve the activity of the thermal initiators which are part of the thermoset formulation; utility of this action is dependent upon the nature of the thermal initiators involved. Typical storage temperatures range from 5° C. to ambient temperature. Shelf life of commercial molding compounds range up to 6 months, dependent upon storage condition practices.

In a production molding environment, the compound will be either used as delivered or fed into a mechanical preformer which shapes the material into a specific shape of known density for use in the intended molding application. Preforming can also be carried out in a continuous fashion as outlined above. The preshaped charge then may or may not be preheated to a temperature below that needed to effect polymerization, but at a high enough temperature to aid in compound flow inside of the mold. It is preferred to carry out preforming of the molding composition immediately after mixing. This is especially true for forming an SMC format.

Molding Process

The molding composition of the present invention can be used in all of the conventional molding techniques: compression molding, transfer molding, and injection molding.

The temperature and pressure conditions in the molding process of the present invention are dependent on a number of factors. One factor is the rheology of the molding composition. Different thicknesses or viscosities may require different temperature and/or pressure profiles as a function of their cure packages. A second factor is the molding technique chosen. The geometry of the mold is also a factor. One critical feature of the mold is the so-called "flash gap" or "flash tolerance". This term indicates any open space between mold halves and/or mold components after the mold is closed through which the uncured molding composition can be forced by pressure. The flash gap(s) should be filled by molding composition and the compositions partially cured before the mold is completely sealed for application of final molding pressure. The shape of the mold is another consideration. More intricate designs for finished articles, such as, for example, molded-in holes, differential thicknesses, screw inserts, multiple draft angles, or moving components may require multiple charges of molding composition, and good internal mold flow prior to polymerization. This will affect the pressure and temperature profiles. The molding conditions are also dependent on the type of molded article to be made, i.e., a simple solid part, or a part in which a non-reactive core is encapsulated.

As used herein, the term "mold charge" refers to an amount of molding composition to be molded into a molded article. It is understood that, depending upon features of the final molded article and/or the geometry of the mold cavity, the charge can be a single unit or a multiple unit charge (i.e., the mold charge can compose of one or more charge units). It is also understood that, where more than one charge unit is used to make an article, the charge units may have different molding compositions.

Several embodiments of the molding process of the present invention are described below:

Process Embodiment 1: Single pressure profile, isothermal

In this method the temperature of the mold is maintained at a essentially constant level throughout the molding cycle. The pressure is increased to the final molding pressure immediately after closing the mold and maintained at that pressure. This method is especially useful where the flash gap of the mold is very small or if the molding composition is highly viscous. Thus, in such applications, it is preferred where one of the following two conditions should be met: (a) the mold has a flash gap no greater than about 130 microns; or (b) the molding composition has a spiral flow length no greater than about 150 cm, preferably no greater than about 100 cm. Additionally, the molded composition should have sufficient hot strength to allow for removal of the molded part while still hot without warping or sagging. Thus, the method generally may not be suitable for making encapsulated parts or parts with very intricate designs.

The first step in the molding process is to provide the mold charge, preferably at room temperature. In some cases, the molding compositions are prepared in advance and stored at refrigerated temperatures. The compositions are generally not malleable enough at the lower temperatures to be easily used. In addition, the temperature gradient in the curing part, especially for thick parts, can lead to internal voids. Therefore, if not already at room temperature, the compositions should be warmed to room temperature, by which is meant about 15–30° C.

The second step is to place the room temperature molding composition in the cavity of a preheated mold. The preheat temperature should besufficient to cause the secondary thermal initiator to pass through about 3–10 half lives, preferably about 4–6 half lives, within about ten minutes or less, preferably within about four minutes or less. The temperature should also not be so hot as to cause depolymerization or to degrade any of the properties of the molded article. In general, for the acrylic-based compositions of the invention, a temperature in the range of from about 100° C. to about 145° C. is useful.

The third step is to close the mold and secure it closed prior to pressurization. The mold is preferably closed as soon as possible to prevent volatilization from the mold charge.

The fourth step is to increase the pressure to a selected final molding pressure. The final molding pressure is selected to maintain the internal and surface geometric integrity of the molded article. The term "molding pressure"

refers to the applied force per unit cross-sectional area in the plane of the mold cavity (in units of pounds per square inch, psi; or kilogram per square centimeter, $kg/cm^2$). By "maintain internal geometric integrity" it is meant that the pressure is chosen to minimize or avoid internal defects such as shrink marks and voids in the molded article. By "maintain surface geometric integrity" it is meant that the pressure is chosen to produce on the molded article surface essentially the same finish as the machined mold cavity surface. The exact pressure chosen will depend on the molding composition used and the desired physical characteristic of the molded article. In general, pressures in the range of from about 500 to about 1500 psi (about 35 to about 105 $kg/cm^2$) are useful. This step is preferably carried out as quickly as the equipment allows. Often, the third and fourth steps can be one action.

The fifth step is to maintain the temperature and pressure for a time sufficient to ensure that the secondary thermal initiator has passed through about 3–10 half lives, preferably about 4–6 half lives. This amount of time is preferably within about ten minutes or less, more preferably within about four minutes or less.

The sixth step is to reduce the pressure to atmospheric pressure.

The seventh step is to open the mold and remove the molded article. Generally, the molded article is removed without cooling the mold.

Process Embodiment 2: Single pressure, dual temperature profile

In this method two different temperatures are used during the molding cycle: initially a lower temperature, which is then increased to a higher temperature. The pressure is increased to the final molding pressure immediately after closing the mold and maintained at that pressure. This method can often be used if the flash gap of the mold is very small or if the molding composition is very stiff. Thus, it is preferred that one of the following two conditions should be met: (a) the mold has a flash gap no greater than about 1300 microns; or (b) the molding composition has a spiral flow length no greater than about 150 cm, preferably no greater than about 100 cm. Because of the dual temperature profile, the method often can be used for encapsulating non-reactive core components and for making parts with intricate designs. At the lower temperature, the molding composition can flow to fill the appropriate spaces without completely polymerizing and without volatilizing the monomer(s) and other volatile components. After this, at the higher temperature, the polymerization reactions are completed.

The first step in the method is the same as in the previous method: to provide the mold charge at room temperature.

The second step is to place the room temperature molding composition in the mold cavity. The initial mold temperature shouldbe set at most about 10° C. lower than the boiling point of the most volatile component. As used herein "the most volatile component" refers any component in the molding composition that has the lowest boiling point. The mold should be set at this initial mold temperature prior to placement of the mold charge into the mold cavity in order to prevent significant volatilization of the most volatile component prior to mold closure. The upper limit for the initial mold temperature is determined by the molding composition. It is preferred that the mold is preheated to an initial mold temperature of preferably at least about 50° C. in order to reduce cycle time. In general, an initial mold temperature in the range of from about 50 to about 90° C. is useful.

The third step is to close the mold and secure it closed prior to pressurization. The mold is preferably closed as soon as possible.

The fourth step is to increase the pressure to a selected molding pressure as in the fourth step in Process Embodiment 1. Often, the third and fourth steps can be one action.

The fifth step, which is carried out concurrently with the fourth step, is to increase the temperature to a temperature which is sufficient to ensure that the secondary thermal initiator passes through about 3–10 half lives within about ten minutes or less, preferably within about four minutes or less. As discussed above, for acrylic-based compositions, a temperature in the range of from about 100° C. to about 145° C. is useful. The rate of temperature increase can be adjusted to achieve a desired method cycle time.

The sixth step is to maintain the temperature and pressure for a time sufficient to ensure that the secondary thermal initiator has passed through about 3–10 half lives, preferably about 4–6 half lives This step is to ensure that the polymerization is complete and that the secondary thermal initiator is essentially depleted. Generally, this amount of time is preferably within about ten minutes or less, more preferably within about four minutes or less.

The seventh step is to cool the temperature to the original preheated temperature from step (2).

The eighth step is to reduce the pressure to atmospheric pressure. Depending upon the application, the seventh and eighth steps can be performed concurrently.

The ninth step is to open the mold and remove the molded article.

Process Embodiment 3: Dual pressure profile, isothermal

In this method, the temperature of the mold is maintained at a constant level throughout the molding cycle. The pressure is increased to a first level and maintained for a period of time and then increased to a final molding pressure for the rest of the molding cycle. This method is often suitable for molds with larger flash gaps and for molding compositions with greater flow.

The first step in the molding process is to provide the mold charge at room temperature.

The second step is to place the room temperature mold charge in the cavity of a preheated mold. The preheated mold temperature should be sufficient to cause the secondary thermal initiator to pass through about 3–10 half lives, preferably about 4–6 half lives, in about ten minutes or less, preferably about four minutes or less. The temperature should also not be so hot as to cause depolymerization or to degrade of any of the properties of the molded article. In general, for the acrylic-based compositions of the invention, a temperature in the range of from about 100 to about 145° C. is useful.

The third step is to close the mold and secure it closed prior to ressurization. The mold is preferably closed as soon as possible.

The fourth step is to increase the molding pressure to an initial level sufficient to fill the mold with the mold charge. By filling the mold, it is meant that the mold charge is delivered to every volume of the mold cavity, including the flash gap. In general, the preferred molding pressure is from about 100 to about 500 psi (7 to 35 $kg/cm^2$).

The fifth step is to maintain the pressure at this level for an amount of time sufficient to seal the flash gap. Generally, the preferred amount of time is from about 30 to about 90 seconds. By sealing the flash gap, it is meant to allow polymerization of the mold charge to an extent such that the viscosity of the mold charge is sufficient to prevent further mold charge material to pass through the flash gap.

The sixth step is to increase the pressure to a selected molding pressure to maintain the internal and surface geometric integrity of the molded article. The selected molding pressure should preferably be at least about 200 psi (14 kg/cm$^2$) greater than the initial molding pressure.

The seventh step is to maintain the mold at the mold temperature and a final molding pressure for a time sufficient to ensure that the secondary thermal initiator has passed through about 3–10 half lives, preferably about 4–6 half lives. Generally, this will be preferably within about ten minutes or less, more preferably within about four minutes or less. This step is performed to ensure that the polymerization is completed and that the secondary thermal initiator is depleted. The final molding pressure may be the same as or different from the selected molding pressure.

The eighth step is to reduce the pressure to atmospheric pressure.

The ninth step is to open the mold and remove the molded article without cooling the mold.

Process Embodiment 4: Dual pressure profile, dual temperature profile

In this method two different temperatures are used during the molding cycle and two different pressures. The method is often suitable for molds with larger flash gaps and for molding compositions with greater flow. As with the Process Embodiment 2, because of the dual temperature profile, the method can be used for encapsulating non-reactive core components and for making parts with intricate designs.

The first step in the method is to provide the mold charge at room temperature.

The second step is to place the room temperature mold charge in the cavity of a mold having an initial mold temperature that is no greater than about 10° C. less than the boiling point of the most volatile component in the composition. Preferably, the mold is preheated. More preferably, the mold is preheated to an initial mold temperature of at least about 50° C. In general, a useful initial mold temperature is from about 50° C. to about 90° C.

The third step is to close the mold and secure it closed prior to pressurization. The mold is preferably closed as soon as possible.

The fourth step is to increase the temperature to a temperature which is sufficient to ensure that the secondary thermal initiator passes through about 3–10 half lives, preferably about 4–6 half lives, within about ten minutes or less, more preferably about four minutes or less. A temperature range of from about 100° C. to about 145° C. is generally used.

The fifth step is to increase the pressure to an initial level sufficient to fill the mold with the mold charge as in the fourth step of Process Embodiment 3.

The sixth step is to maintain the pressure at this level for a time sufficient to effectively seal the flash gap, as in the fifth step of Process Embodiment 3.

The seventh step is to increase the pressure to a selected molding pressure to maintain the internal and surface geometric integrity of the molded article. Preferably, the selected selected molding pressure is at least about 200 psi (14 kg/cm$^2$) greater than the initial molding pressure.

The eight step is to maintain the mold at the mold temperature and a final molding pressure for a time sufficient to ensure that the secondary thermal initiator has passed through about 3–10 half lives, preferably about 4–6 half lives. The final molding pressure may be the same as or different from the selected molding pressure in the seventh step. This amount of time is preferably within about ten minutes or less, more preferably within about four minutes or less. This step is to ensure that polymerization is completed and that the secondary thermal initiator is essentially depleted.

The ninth step is to cool the mold to the original preheated temperature from step (2). The pressure during this cooling step may be different or the same as the final molding pressure.

The tenth step is to reduce the pressure to atmospheric pressure.

Depending upon the application, the ninth and tenth steps can be performed concurrently.

The eleventh step is to open the mold and remove the molded article.

In the molding processs of the invention, the temperature and pressure control allows for the formation of parts free of both surface and internal defects.

It also allows for low cycle times with minimal part shrinkage, which lowers the manufacturing cost. The use of the cool charging temperature (Process Embodiments 2 and 4) allows parts to be made without material knit lines which result from monomer volatility. It also allows easier production of parts free of surface defects. The use of dual pressure profiles (Process Embodiments 3 and 4) allows the use of low viscosity compositions and minimization of part shrinkage.

It is understood that those embodiments of the present invention employing a "dual pressure profile" may employ intermediate pressure steps as well. By "intermediate pressure," it is meant a pressure during the molding process that is other than the initial and the final molding pressures. Similarly, it is understood that those embodiments of the present invention employing a "dual temperature profile" may also employ steps at intermediate temperatures. By "intermediate temperature," it is meant a temperature during the molding process that is other than the initial and the final molding temperature Process Embodiments 5–8: Intricate Design Method The present invention also relates to a method for making an article having at least one intricate design detail. In a preferred embodiment, this method is performed using the general steps of any one of Process Embodiment 1 through 4. The general steps of Process Embodiment 3 or Process Embodiment 4 can be especially useful for making articles having intricate design details using lower viscosity molding compounds as mold charges. The dual pressure profile of Process Embodiments 3 and 4 may be useful for not only avoiding flashing the molding compound out of the flash gap, but also to allow application of increased pressures to follow polymerization shrinkage and prevent internal voiding, shrink sink areas, and other internal and external defects in the molded article.

Regardless of which of the Process Embodiment general steps are used, the mold charge is preferably first preformed into a single unit charge or into multiple unit charge consistent with the dimensions of the mold cavity.

Preforming generally provides advantages such as the following: (1) it minimizes the material flow distance within the mold; (2) it minimizes the amount of monomer offgassing from the molding compound as the mold closes and fills. As used herein, "offgassing" refers to volatilization from the molding compound, which results in the formation of dry spots on the finished article. After preforming the mold charge, it is placed in the mold cavity, preferably as quickly as possible. Especially for making articles having multiple intricate design details, several different shapes or dimensions may be needed to sufficiently charge the mold. Once the mold is charged, it should be closed without delay and the molding cycle is continued as described in any one of Process Embodiments 1 through 4.

Particularly in compression molding, the operating conditions of Process Embodiment 2 are preferred for making articles containing intricate designs because the lower charging temperature removes or reduces the level of monomer offgassing at the point of contact between the molding compound and the warmed surface of the mold cavity.

Particularly in the cases of transfer or injection molding, the charge preforming is not critical. The unpreformed ingot of molding composition can be cut and introduced into the mold, which does its own preforming via transfer cylinders or injection screws. While a cooler "charging" temperature may or may not be useful in these methods, it could increase cycle time.

Process Embodiments 9–12: Encapsulation Method

The compositions and methods of the invention are also suitable for the encapsulation of non-functional materials. By "non-functional materials" is meant materials which take up volume, may impart a desirable aesthetic, but do not impart a new functional capability in the molded article. Examples of non-functional materials include sheet materials of wood products, such as particle board; filled and unfilled polymers; decorative surface materials such as Corian® solid surface materials; recycled plastics; and others. Such materials may be encapsulated by the compositions of the invention to achieve the aesthetics of solid surface materials at a lower cost. Part features, such as screw inserts, can be encapsulated by the molding composition, as well, resulting in integral hardware in the parts. Such parts are also hermetically sealed and resistant to environmental effects, such as humidity.

In addition, metal and metal/plastic composites can be encapsulated to provide good heat transfer for the surface materials. Fiber mats or cloth of glass or organic polymers, such as polyaramids, can be encapsulated to provide structural reinforcement and/or flame retardancy. Honeycomb structures can be encapsulated to produce articles of reduced weight. Such encapsulated articles are conveniently produced by injection molding, however, compression and transfer molding techniques can also be used.

The compositions and processes of the invention are also useful for the encapsulation of functional inserts. By "functional insert" is meant a material which imparts a new use or function to the article. Such new use may be heating or cooling, electrical, plumbing, sound dampening, providing a firewall, making the article penetration-resistant or penetration-proof, among others. Examples of suitable functional inserts include electrical parts, light emitting materials, heated resistance wires, electronic wiring, plumbing units, heating and cooling coils, and many others. Such encapsulated articles are also conveniently produced by injection molding, however, compression and transfer molding techniques can also be used.

The present invention further relates to an method for making a article including at least one encapsulated core. Encapsulation can be achieved using compression molding, preferably following the general steps of Process Embodiment 1 or 2 above; or using transfer or injection molding, preferably following the general steps of Process Embodiment 3 or 4 above.

When compression molding is used for encapsulating a core, the encapsulant core is preferably sandwiched between at least two preformed charges of molding compound in a "composite" charge. This charge may be joined by secondary charges to fully charge the mold as outlined above in any one of Process Embodiment 1 through 4. The encapsulant core may be held in place by hardware inserted into (or a part of) the encapsulant, by pins which are an integral part of the mold design, or by the thickness and homogeneity of the equal preformed charges themselves. The mold is closed and cycled with the same considerations as above in Process Embodiment 1 or 2.

In encapsulating a core using transfer or injection molding, the core is preferably introduced into the mold cavity and held in place either by the design of the encapsulant itself or by design elements of the mold such as, for example internal pins or fixtures. The mold charge can be introduced into the mold via injection where the molding compound is forced into the mold, encapsulating the inserted core. The mold is closed and cycled according to the general steps described in Process Embodiment 3 or 4.

The nature of the encapsulant, such as the impurities contained in the encapsulant, often affects the method chosen to carried out the molding. For example, a steel sheet encapsulant generally would not expand during the molding process. Therefore, any of the above-described Process Embodiment 1 through 4 may be suitable for making a molded article encapsulating the steel sheet. In contrast a particle board encapsulant generally may contain moisture that may vaporize during the molding process. Therefore, Process Embodiments 2 and 4 may be more suitable for making a molded article encapsulating the particle board.

It is understood that the present invention is moreover directed to a method for making an article having at least one core encapsulated therein and at least one intricate design on the article surface, which method preferably includes a combination of the general steps described in any one of Process Embodiments 5 through 8 with the general steps described in any one of Process Embodiments 9 through 12.

Finishing

Finishing concerns in molded products are generally fairly minor versus those encountered in cast products. The finish surface of the molded part is largely dictated by the finish of the machined mold. Finishing of molded parts primarily involves removal of the flashing or residual polymerized compound which accumulates at gaps in the mold such as mold parting lines, ejection pins, and sliders. This is removed by light sanding or milling to provide the finished part. In some cases, surface defects are observed in molded parts due to mold design or mold finish issues; such defects must be removed, if possible, by sanding and polishing.

The compositions and processes of the invention are also suitable for producing articles in which the molding material is on at least a part of one or more, but not all surfaces of a substrate. In such articles, the substrate is not completely encapsulated by the molding material. The substrate can be a flat sheet with a sheet of molding composition overlying all or part of one side. Such molded structures can have advantages in terms of adhesion and strength when compared to laminated structures which are glued together. In some cases, the substrate will be prestressed prior to molding to prevent distortion in the final molded article arising from time and/or shrinkage forces. Alternatively, the molding composition can be molded onto two or four sides of a flat substrate, leaving the sides and/or ends exposed. In addition, a three-dimensional shape can be molded onto a flat substrate, a flat sheet can be molded onto a three-dimensional substrate, and a three dimensional shape can be molded onto a three-dimensional substrate. It will be clear that there are a variety of molding options in which the molding composition is molded onto all or part of a substrate. Examples of suitable substrates include wood, metal, woven and nonwoven fiber mats, clths, and veils, clear polymeric materials, filled polymeric materials, honeycomb structures and others. Combinations of substrates, including composites substrates, can also be used. An unfilled acrylic sheet is particularly suitable as a substrate for either a sheet molded material or a shaped molded material. Alternatively, a woven or nonwoven fiber mat may be impregnated into the molded article for structural reinforcement and/or as a structural barrier.

The compositions and methods of the invention are also suitable for producing articles in which the molding material is on only one surface of a substrate. Examples of suitable substrates include wood, metal, clear polymeric sheets, honeycomb structures and others. In some cases, the substrate will be prestressed to prevent distortion in the final molded article arising from time and/or shrinkage forces. Alternatively, a nonwoven or woven fiber mat may be impregnated into the molded article for structure reinforcement and/or as a structural barrier.

The molding processes of the present invention produce molded articles requiring fewer finishing steps when compared to articles made from casting processes. The molding processes have low cycle times and result in products which are robust. The molding methods of the present invention are especially suitable for high volume production of high quality engineered parts. When acrylic-based molding materials are used, the products made from the composition and methods of the invention have the aesthetic appearance of filled acrylic materials. They further have other advantages associated with filled acrylic materials, such as UV stability, opacity, hardness, repairability, inconspicuous seaming, stain resistance and fabricability.

Aspects of the present invention are shown by the following examples for purposes of illustration. These examples and embodiments are not meant to limit the invention in any way. Those skilled In the art will recognize that charities, additions, and modifications may be made, all within the spirit and scope of the invention and how it relates to the production of new functionalities and aesthetics for the sold surfaces industry.

EXAMPLES

Various components of the molding compositions used in Examples 1–22 are described below:

Acrylic Sirup

A reactive acrylic sirup composed of 15–25% by weight of a non-crosslinked polymer resin dissolved in a monomer solution was prepared by either (1) partially polymerizing an acrylic monomer mixture or (2) dissolving one or more acrylics resins in one or more acrylic monomers.

In the former case (1), a sirup comprising 24% polymethylmethacrylate (Mn approx. 32,000) dissolved in methylmethacrylate was prepared by partial polymerization of methylmethacrylate using 2,2'-azobis(isobutyronitrile) initiator [supplied by VAZO 64 from E. I. du Pont de Nemours and Company] in a continuous reactor process.

In the latter case (2), such a sirup was prepared by dissolving one or more of the following acrylic resins in MMA at 3–24 wt % solids:

| | |
|---|---|
| V045 acrylic resin | 99.5% poly(methylmethacrylate/ethyl acrylate), Mn > 60,000; supplied by ATOHAAS, Philadelphia, PA; |
| Elvacite ® 2014 resin | 98–100% poly(methylmethacrylate/2-ethylhexyl acrylate/methacrylic acid), Mn > 70,000; supplied by ICI Acrylics Inc., Wilmington, DE |

Soluble, poly-(meth)acrylic-functional oligomeric species was also be included in sirup formulations. Polymerization inhibitors such as methylhydroquinone (MEHQ) were added as needed.

Initiators

The Examples employed one of the primary thermal initiators listed below:

| | |
|---|---|
| Lipersol 10M75 Atochem (King of Prussia, PA); ten hour half life temperature of | t-Butyl Peroxyneodecanoate supplied as a 75% solution in OMS (Odorless Mineral Spirit) by Elf 48° C.; or |
| Lupersol 11 | t-Butyl Peroxypivalate supplied as a 75% solution in OMS by Elf Atochem; ten hour half life temperature of 58° C. |

The secondary thermal initiator employed was 2,2'-azobis (methylbutyro-nitrile) supplied as a 100% solid by DuPont (Wilmington, Del.) under the tradename VAZO 67, with a ten hour half life temperature of 67° C.

Alumina Trihydrate (ATH)

The ATH fillers listed in Table 1 below were used in the Examples:

TABLE 1

ATH fillers

| ATH filler(s) | d50 particle size (microns)* | Supplier |
|---|---|---|
| untreated ATH | 36 | ALCAN (Quebec, Canada) |
| untreated ATH or A174 silane-treated ATH | 11 | SOLEM (China) |
| A174 silane-treated ATH | 47 | Nippon Light Metals (Japan) |

*Particle sizes and particle size distributions were measured using a Leeds & Northrup Microtrac FRA Instrument.

Decorative Filled Acrylic Particles (DFAP's)

Decorative filled acrylic particles were prepared from ATH-filled PMMA by milling and/or grinding to the desired extent. The material composition is characteristically 55–65% ATH by weight and contains pigments to achieve the desired color. The particle sizes were then separated by sieve into fractions. These fractions were combined in various ratios needed to achieve the desired aesthetic pattern effect in the molded article. Combined fractions of different colors were used to achieve the desired color effect in the molded article.

Setting Agent

Polymer particle setting agents employed in the Examples are listed in Table 2 below:

TABLE 2

Polymer Particle Setting Agents

| Setting Agent | Composition | d50 Particle Size (microns)* | Available from |
|---|---|---|---|
| PARALOID ® K-120 N-D | 99–100% poly(methylmethacrylate/ethyl acrylate) | 122 | Rohm and Haas Company, Philadelphia, PA |
| Kane Ace FM-25 | >98% poly(methylmethacrylate/acrylic) core/shell copolymer | 150–190 | Kaneka Texas Corporation. Pasadena, TX |
| Kane Ace FM-20 | >98% poly(methylmeth- | 150–190 | Kaneka Texas Corporation. |

TABLE 2-continued

Polymer Particle Setting Agents

| Setting Agent | Composition | d50 Particle Size (microns)* | Available from |
|---|---|---|---|
| | acrylate/acrylic) core/shell copolymer | | Pasadena, TX |
| Elvacite ® 2896 | >99% polymethylmeth-acrylate | 7–130 | ICI Acrylics Inc., Wilmington, DE |
| Elvacite ® 2041 | [>99% polymethylmeth-acrylate | 150 | ICI Acrylics Inc. |

*Particle sizes and particle size distributions were measure using a Leeds & Northrup Microtrac FRA Instrument.

Composite polymer/filler particle setting agents employed in the Examples were: filled acrylic particles generated from the milling, sawing and sanding of Corian® ATH-filled acrylic polymer solid surface materials; d50 of 60 microns. Particle sizes and particle size distributions were measured using a Leeds & Northrup Microtrac FRA Instrument.

Unless otherwise stated, all mixing steps were performed at room temperature. For those mixing steps that employed a water-cooled mixing cavity, the mixing temperature was between about 10° C. to about 15° C.

Additional materials employed in this 4 work are straightforward to those skilled in the art and are described below in specific examples.

Spiral Flow Length Measurement

The spiral flow length is related to viscosity and measured under molding conditions. A spiral flow method using a test mold manufacture by the Atlantic Tool & Die Company (S. Plainfield, N.J.) was used in the Examples This spiral mold has the following dimensions: 75 inch (190.5 cm) long; 0.375 inch (0.95 cm) wide; 0.125 inch (0.32 cm) deep; with a plunger diameter of 2-3/8 inch (6.03 cm). The bottom half of the mold is graded in 0.25 inch (0.635 cm) increments.

The technique used a transfer mold in which the molding composition is forced out of the transfer cylinder and into a spiral runner under the pressure and temperature conditions to be used in the molding application. A charge of from about 50–100 g of molding composition was placed in the transfer cylinder of the mold which has been preheated to a temperature of from about 125° C. The mold was then closed with a clamping pressure of from about 500 psi (42.2 kg/cm$^2$). The mold was opened after about 3 minutes and the molded part was ejected. The maximum flow distance was then measured by reading the imprinted scale on the bottom of the part.

Example 1

Preparation of Molding Compound

A liquid mixture having the components listed in Table 3 below was prepared.

TABLE 3

Example 1 Liquid Mixture

| Component | Parts by Weight |
|---|---|
| Acrylic sirup, 24% V046 solids in MMA | 705 |
| Ethylene glycol dimethacrylate | 32.2 |

TABLE 3-continued

Example 1 Liquid Mixture

| Component | Parts by Weight |
|---|---|
| Lupersol 11 | 3.2 |
| VAZO 67 | 0.5 |
| Zelec MO | 2.9 |
| Black Pigment Dispersion | 3.0 |

The liquid mixture was mixed to ensure homogeneity. The black pigment dispersion employed was a 5% solids dispersion of carbon black in epoxidized soybean oil used as furnished by RBH Dispersions, Boundbrook, N.J.

The solid materials listed in Table 4 below were introduced into a constant rpm 1.5 gallon double arm sigma blade mixer (Baker-Perkins) and premixed for 1 minute:

TABLE 4

Example 1 Solid Materials

| Component | Parts by Weight |
|---|---|
| ATH; NLM silane-treated | 1950 |
| Rohm & Haas K120ND | 366 |
| Zinc Stearate | 4.5 |

The liquid mixture was added and the molding compound was mixed for 8 minutes at which point the material transformed into a thick molding compound of uniform composition. The molding compound was removed from the mixer and packaged in bulk form in an airtight plastic bag. The compound was then stored at 5–10° C.

Within 24 hours of mixing, the molding compound consistency and performance was evaluated using a spiral flow mold at 125° C. with an applied pressure of 500 psi. Under these conditions, the flowlength fell between 31"(78.7 cm) and 34" (86.4 cm).

Example 2

Isobaric/Isothermal Molding Process of Example 1 Composition

The molding compound of Example 1 was evaluated by compression molding in a 10"×10"(25.4 cm ×25.4 cm) test mold constructed of steel, designed with a flash gap of 0.001" (25 micron), and having internal electric heater units. The mold was preheated to 125° C. and a 1040 g charge of molding compound was placed in the cavity. The mold was closed and a pressure of 800 psi (56.4 kg/cm$^2$) applied. After 5 minutes, the mold was opened and the resulting plaque removed.

Although the resulting molded plaque presented excellent reproduction of the mold surface and dimension, it also showed surface defects associated with monomer boiloff prior to mold closure. These detects are surface in nature and are manifested as whitened, microvoided areas on the bottom of the part where the molding charge was in contact with the hot mold prior to mold closure. Physical properties of the molded material are shown in Table 5 below in comparison with typical values for a Corian® Genesis Pearl Gray continuous cast filled acrylic solid surface material.

TABLE 5

Comparative Physical Properties

|  | Ex. 1 | Corian ® Genesis Pearl Gray |
|---|---|---|
| Flexural Energy to Break (in-lb) | 2.80 | 3.50 |
| Flexural % Strain at Break | 0.96 | 0.99 |
| Rockwell M hardness | 84 | 90 |
| Maximum Impact Energy (in-lb) [0.25" (0.64 cm) thickness] | 6.77 | 7.98 |

Example 3

Isobaric/Temperature Profile Molding Process of Example 1 Composition

The molding compound of Example 1 was evaluated using a mold charging temperature of 80° C. The 1040 g charge was introduced into the mold cavity and the mold was closed. Immediately, the applied pressure was increased to 800 psi (56.4 kg/cm$^2$) and the mold temperature was increased to 125° C. Three minutes after the mold temperature reached 125° C., the mold was opened and the resulting plaque removed. The whitened surface defects observed in Example 1 were not present.

Example 4

Use of Smaller Particle Size ATH in Example 1 Composition

The molding compound of Example 1 was reproduced substituting the silane-treated Solem ATH for the NLM silane-treated ATH. The mixing character was identical as was the moldability of the resulting molding compound. The resulting material exhibited improved physical properties while maintaining aesthetic appearance. Physical data are listed in Table 6 below.

TABLE 6

| Flexural Energy to Break (in-lb) | 4.84 |
|---|---|
| Flexural & Strain at Break | 1.37 |
| Rockwell M Hardness | 87 |

Example 5

Calcium Carbonate Filter Substituted for ATH in Example 1 Composition

The molding compound of Example 1 was reproduced substituting calcium carbonate (Polar Minerals, Mt. Vernon, Ind.) for the NLM silane-treated ATH. Also, a sirup (nominally 24% solids) prepared via industrial scale partial polymerization of MMA using 2,2'-azobis(2-methylpropanenitrile) [sold as VAZO 64 by DuPont Company, Wilmington Del.] as thermal initiator was employed. The mixing behavior of this formulation was somewhat more difficult, taking more time to achieve even mixing. Moldability of the resulting molding compound was similar to the above. As expected the molded plaque exhibited a more opaque appearance as compared to that of Example 1. Physical data are listed in Table 7 below:

TABLE 7

| Flexural Energy to Break (in-lb) | 2.40 |
|---|---|
| Flexural % Strain at Break | 0.99 |
| Rockwell M Hardness | 86 |

Example 6

Dacron® Fiber as Setting Agent and Reinforcement

The molding compound of Example 1 was reproduced using the following mixture of solids components listed in Table 8 below:

TABLE 8

Solid Components

| Component | Parts by Weight |
|---|---|
| ATH; NLM silane-treated | 1950 |
| Rohm & Haas K120ND | 210 |
| 0.125" Dacron ® fiber | 90 |
| Zinc Stearate | 4.5 |

Also, a sirup (nominally 24% solids) prepared via industrial scale partial polymerization of MMA using 2,2'-azobis(2-methylpropanenitrile) [sold as VAZO 64 by DuPont Company, Wilmington, Del.] as thermal initiator was employed. The liquid mixture was added to the above mixture after mixing for 1 minute. The molding compound was mixed for 7 minutes before it was removed from the mixer and packaged. Due to the MMA-absorptive nature of the Dacron® fiber, the material achieved a similar viscosity. The molding compound was evaluated using the 10"×10" test mold and the isothermal/isobaric pressing profile described in Example 1. Upon molding, very little flash was observed. It appeared that the swollen polyester fiber aided in sealing the mold cavity in the early stages of the molding process. Although flexural properties remained unchanged, the presence of the fiber reinforcement prevented catastrophic failure (shatter) in flexural and impact measurements.

Formulation Without Noncrosslinked Polymer Resin

A liquid mixture was introduced into a water cooled 2.5 gallon double planetary mixer (Charles Ross & Son Company; Hauppauge, N.Y.). The liquid mixture contained the components listed in Table 9 below:

TABLE 9

Liquid Mixture

| Component | Parts by Weight |
|---|---|
| MMA | 540 |
| Ethylene glycol dimethacrylate | 32.4 |
| Lupersol 11 | 3.2 |
| VAZO 67 | 0.5 |
| Zelec MO | 8.4 |
| Black Pigment Dispersion | 3.0 |

This liquid mixture was mixed to ensure homogeneity. The black pigment dispersion employed was a 5% solids dispersion of carbon black in epoxidized soybean oil used as furnished by RBH Dispersions, Boundbrook, N.J. To this mixture was added the components listed in Table 10 below, in the order listed:

TABLE 10

| Component | Parts by Weight |
|---|---|
| Zinc Stearate | 4.5 |
| ATH; NLM, silane-treated | 1950 |
| Rohm & Hass K120ND | 465 |

The zinc stearate was mixed with the liquids for 5 minutes. The ATH was added and the mixture was mixed for an additional 5 minutes to ensure even wetting. The Rohm & Haas K120ND was then added at high mixer rpm, forming a dry mixture which coalesced into a stiff molding compound within three minutes. The compound was then mixed for an additional twenty minutes under a 25" Hg vacuum (735 mm Hg). The molding compound was removed from the mixer and packaged in bulk form in an airtight plastic bag. The compound was then stored at 5–10° C.

The molding compound was evaluated using the 10"×10" test mold and the isothermal/isobaric pressing profile described in Example 1. Physical data is presented in Table 11 below:

TABLE 11

| | |
|---|---|
| Flexural Energy to Break (in-lb) | 3.45 |
| Flexural % Strain at Break | 1.06 |
| Rockwell M Hardness | 80 |

Example 8

Formulation Employing Decorative Fillers

A liquid mature containing the components listed in Table 12 below was prepared. The liquid mixture was introduced into a water cooled 2.5 gallon double planetary mixer (Charles Ross & Son Company; Hauppauge, N.Y.):

TABLE 12

Liquid Mixture

| Component | Parts by Weight |
|---|---|
| Acrylic sirup, 24% V045 solids | 711 |
| Ethylene glycol dimethacrylate | 32.4 |
| Lupersol 11 | 3.2 |
| VAZO 67 | 0.5 |
| Zelec MO | 3.2 |

This liquid mixture was mixed to ensure homogeneity.

The following solid materials listed in Table 13 below were premixed and introduced together into the mixer:

TABLE 13

Solid Components

| Component | Parts by Weight |
|---|---|
| ATH - NLM, silane-treated | 1436 |
| Rohm & Haas K120ND | 120 |
| Zinc Stearate | 4.5 |

The mixture was mixed for 2 minutes at which point the material transformed into a paste. A mixture of decorative ATH-filled acrylic particles (DFAP's) within the size range of 30 to 150 mesh (approx. 100–560 microns) was added and mixed in:

| | |
|---|---|
| DFAP's | 690 parts by weight |

The mixture divas mixed for 15–20 minutes under 25" Hg vacuum (735 mm Hg) during which the material transformed into a thick molding compound of uniform composition. The molding compound was removed from the mixer and packaged in bulk town in an airtight plastic bag. The compound was stored at 5–10° C.

Within 24 hours of mixing, the molding compound consistency was evaluated using a spiral now mold at 125° C. and an applied pressure of 500 psi. Under these conditions, the flowlength falls between 28"(71.1 cm) and 32" (81.3 cm).

Example 9

Isobaric/Isothermal Molding Process of Example 8 Composition

The molding compound was also evaluated by compression molding in the 10"×10" test mold described in Example 1. The mold was preheated to 125° C. and a 530 g charge of molding compound was placed in the cavity. The mold was closed and a pressure of 800 psi (56.4 kg/cm$^2$) applied. After 5 minutes, the mold was opened and the resulting plaque removed.

Although the resulting molded plaque presented excellent reproduction of the mold surface and dimension, it also showed surface defects associated with monomer boiloff prior to mold closure. These detects are surface in nature and are manifested as whitened, microvoided areas on the bottom side of the part where the molding charge was in contact with the hot mold prior to mold closure. The molded article has a uniform granite-like appearance exhibiting a translucent visual depth. Physical properties of the molded material are shown in Table 14 below in comparison with typical values for Corian® Sierra Dusk continuous cast filled solid surface material.

TABLE 14

Comparative Physical Data

| | Ex. 8 | Corian ® Sierra Dusk Material |
|---|---|---|
| Flexural Energy to Break (in-lb) | 3.04 | 3.38 |
| Flexural % Strain at Break | 0.99 | 1.05 |
| Rockwell M hardness | 84 | 91 |

TABLE 14-continued

Comparative Physical Data

|  | Ex. 8 | Corian ® Sierra Dusk Material |
|---|---|---|
| Maximum Impact Energy (in-lb) [0.25" (0.64 cm)thickness] | 7.64 | 5.68 |

By gas chromotagraphy analysis the overall residual MMA was measured 0.62% by weight of the polymerized sample. This translates to 3.4% of the amount of monomers present in the original molding composition.

Example 10

Isobaric/Temperature Profile Molding Process of Example 8 Composition

The molding compound of Example 8 was evaluated using a mold charging temperature of 80° C. A 1040 g charge was introduced into the mold cavity and the mold was closed. Immediately, the applied pressure was increased to 800 psi (56.4 kg/cm$^2$) and the molt temperature was increased to 125° C. Three minutes after the mold temperature reached 125° C., the mold was opened and the resulting plaque removed. The whitened surface defects observed in Example 8 were not present.

Example 11

Effect of Increasing Amounts of Crosslinking Agent in Example 8 Composition

The effect of crosslinking agent on the hot strength of the molded article was evaluated by altering the level of crosslinking agent in the molding compound.

Two compositions (A and B) were prepared. The liquid mixtures of Composition A and B are listed in Table 15 below. Each of the two liquid mixtures was introduced into a separate water-cooled 2.5 gallon double planetary mixer (Charles Ross & Son Company; Hauppauge, N.Y.):

TABLE 15

Liquid Mixture Components

| Components | Composition A (Parts by Weight) | Composition B (Parts by Weight |
|---|---|---|
| Acrylic sirup, 24% V045 solids | 732 | 691 |
| Ethylene glycol dimethacrylate | 11.1 | 52.5 |
| Lupersol 11 | 3.3 | 3.2 |
| VAZO 67 | 0.6 | 0.5 |
| Zolec MO | 3.2 | 3.2 |

Each liquid mixture was mixed to ensure homogeneity.

The solid materials listed in Table 16 below were premixed and introduced into the mixer for each of the two liquid mixtures:

TABLE 16

Solid Components for Compositions A and B

| Component | Parts by Weight |
|---|---|
| ATH - NLM, silane-treated | 1436 |
| Rohm & Haas K120ND | 120 |
| Zinc Stearate | 4.5 |

The mixture was mixed for 3 minutes at which point the material transformed into a paste. A mixture of decorative ATH-filled acrylic particles (DFAP's) within the size range of 30 to 150 mesh (approx. 100–560 microns) was added to each composition and mixed in:

| Component | Parts by Weight |
|---|---|
| DFAP's | 690 |

The mixture was mixed for 15–20 minutes under 25" Hg vacuum (735 mm Hg) during which the material transformed into a thick molding compound of uniform composition. The molding compound was removed from the mixer and packaged in bulk form in an airtight plastic bag. The compound was stored at 5–10° C.

The molding compounds were evaluated versus the formulation of Example 8 using the 10"×10" mold described in Example 1. The mold was preheated to 125° C. and a charge of molding compound sufficient to create a 0.25" (0.64 cm) thick molded plaque was placed in the cavity. The mold was closed and a pressure of 800 psi (56.4 kg/cm$^2$) applied. After 5 minutes, the mold was opened and the resulting plague was removed hot using the internal ejector pins. After cooling, the molded plaques were examined for deformation and whitening in the ejector pin contact areas.

The plaque prepared from formulation A above showed significant deformation and whitening, even on the top surface of the plaque. The plaque prepared from the formulation of Example 8 showed minor deformation and slight whitening on the lower surface. The plaque prepared from formulation B above showed no visible deformation or whitening. Therefore, the formulation B plaque exhibited the highest hot strength upon removal of the article from the mold.

An instrumented impact analyzer, INSTRON DYNATUP Model 8250 available from Instron, was used to measure the maximum impact energy of the samples from the molded articles made from formulations A, B and Example 8 composition. The sample dimensions were 4 by 4 by 0.25 inches.

The instrumented impact data are shown in Table 17 below.

TABLE 17

|  | A | Ex. 8 | B |
|---|---|---|---|
| Maximum Impact Energy (in-lb) [0.25" (0.64 cm) thickness] | 8.21 | 7.64 | 7.22 |

Example 12

Effect of Crosslinking Agent Character on Hot Strength and Physical Properties

The effect of crosslinker character on physical properties and molded article hot strength was demonstrated through use of an aliphatic urethane polymethacrylate oligomer. This material was supplied by the Sartomer Company (Exton, Pa.) as CN1963, a 75% solution of oligomer in trimethylolpropane trimethacrylate.

A liquid mixture was prepared. Components of the liquid mixture are listed in Table 18 below. The liquid mixture was introduced into a water-cooled 2.5 gallon double planetary mixer (Charles Ross & Son Company; Hauppauge, N.Y.):

TABLE 18

| Liquid Mixture | |
|---|---|
| Component | Parts by Weight |
| Acrylic sirup, 24% VO45 solids | 668 |
| CN1963 | 77 |
| Lupersol 11 | 3.0 |
| VAZO 67 | 0.5 |
| Zelec MO | 3.2 |

The liquid mixture was mixed to ensure homogeneity.

The solid materials listed in Table 19 below were pre-mixed and introduced into the mixer:

TABLE 19

| Solid Components | |
|---|---|
| Component | Parts by Weight |
| ATH - NLM, silane-treated | 1437 |
| Rohm & Haas K120ND | 120 |
| Zinc Stearate | 4.5 |

The mixture was mixed for 3 minutes at which point the material transformed into a paste. A mixture of decorative ATH-filed acrylic particles (DFAP's) within the size range of 30 to 150 mesh (approx. 100–560 microns) was added and mixed in:

| Component | Parts by Weight |
|---|---|
| DFAP's | 690 |

The mixture was mixed for 15–20 minutes under 25" Hg vacuum (735 mm Hg) during which the material transformed into a thick molding compound of uniform composition. The molding compound was removed from the mixer and packaged in bulk form in an airtight plastic bag. The compound was stored at 5–10° C.

The molding compound was evaluated using the 10"×10" mold described in Example 1. The mold was preheated to 125° C. and a charge of molding compound sufficient to create a 0.25" (0.64 cm) thick molded plaque was placed in the cavity. The mold was closed and a pressure of 800 psi (56.4 kg/cm$^2$) applied. After 5 minutes, the mold was opened and the resulting plaque was removed hot using the internal ejector pins. The resulting molded article was found to have excellent hot stregnth. Instrumented impact testing measured a maximum impact energy of 7.7 in-lbs.

Example 13

Use of FAP's as Setting Agent

A liquid mixture having the components listed in Table 20 below was prepared. The liquid mixture was introduced into a water-cooled 2.5 gallon double planetary mixer (Charles Ross & Son Company; Hauppauge, N.Y.):

TABLE 20

| Liquid Mixture | |
|---|---|
| Component | Parts by Weight |
| Acrylic sirup, 20% V045 solids | 1019 |
| Ethylene glycol dimethacrylate | 13.0 |
| Lupersol 10M75 | 3.3 |
| VAZO 67 | 0.8 |
| Zelec MO | 4.1 |

This liquid mixture was mixed to ensure homogeneity.

The solid materials listed in Table 21 below were pre-mixed and introduced into the mixer:

TABLE 21

| Solid Components | |
|---|---|
| Component | Parts by Weight |
| ATH - ALCAN, non-treated | 1960 |
| FAP's | 200 |

The mixture was mixed for 3 minutes at which point the material transformed into a paste. A mixture of decorative ATH-filled acrylic particles (DFAP's) within the size range of 30 to 150 mesh (approx. 100–560 microns) was added and mixed in:

| Component | Parts by Weight |
|---|---|
| DFAP's | 800 |

The mixture was mixed for 20 minutes under a 25" Hg vacuum (735 mm Hg) during which the material transformed into a thick molding compound of uniform composition. The molding compound was removed from the mixer and packaged in bulk form in an airtight plastic bag. The compound was stored at 5–10° C.

The resulting molding compound was molded using a steel hand mold thigh a 6" (15.24 cm) diameter cavity which molds a 0.5" (1.27 cm) thick part. The mold cavity was preheated to about 80° C. by placing the mold between 125° C. press platens. The mold was charged and returned to the press and placed under 1000 psi (70.45 kg/cm$^2$) for 6 minutes during which time the external mold temperature reached 118° C. for a period of at least 3 minutes. The platens were then water cooled until the external mold temperature reached about 80° C. whereupon the maid was removed and opened. The molded plaque showed excellent surface quality. Selected physical properties are an shown in Table 22 below:

TABLE 22

| Flexural Energy to Break (in-lb) | 2.5 |
|---|---|
| Flexural % Strain at Break | 0.80 |

Example 14

Molding Compound Composition Using Core/Shell Latex Setting Agent

A liquid mixture having the components listed in Table 23 below was prepared. The liquid mixture was introduced into a water-cooled 2.5 gallon double planetary mixer (Charles Ross & Son Company; Hauppauge, N.Y.):

TABLE 23

Liquid Mixture

| Component | Parts by Weight |
|---|---|
| Acrylic sirup, 20% V045 solids | 1300 |
| Ethylene glycol dimethacrylate | 16.6 |
| Lupersol 10M75 | 4.2 |
| VAZO 67 | 1.0 |
| AOT-S | 1.6 |
| Zelec MO | 4.2 |

This liquid mixture was mixed to ensure homogeneity.

The following solid materials listed in Table 24 below were premixed and introduced into the mixer:

TABLE 24

Solid Components

| Component | Parts by Weight |
|---|---|
| ATH - ALCAN, non-treated | 2525 |
| Kaneka FM-25 | 225 |

The mixture was mixed for 3 minutes at which point the material transformed into a paste. A mixture of decorative ATH-filled acrylic particles (DFAP's) within the size range of 30 to 150 mesh (approx. 100–560 microns) was added and mixed in:

| Component | Parts by Weight |
|---|---|
| DFAP's | 950 |

The mixture was mixed for 10 minutes under 25" Hg vacuum (735 mm Hg) during which the material transformed into a thick molding compound of uniform composition. The molding compound was removed from the mixer and packaged in bulk form in an airtight plastic bag. The compound was stored at 5–10° C.

Example 15

Encapsulation of Particle Board Insert with Example 14 Composition

A particle board insert was prepared from 0.625" stock with dimensions 9 625"×9.625". Screw inserts were placed into the particle board in each corner, two inches from each side. The holes of each insert were plugged with a urethane foam material. Strips of Black Pearl Corian® (DuPont Company, Wilmington, Del.) with cross sectional dimension 0.25"×0.25" were centered and fastened onto the edges of the particle board using a commercial cyanoacrylate adhesive.

Two charges of the above formulation, each weighing 603 g, were each prepressed into a uniform thickness, circular charge about 9" in diameter. The particle board insert was sandwiched between the charges to create a composite charge. The composite charge was placed into a room temperature 10"×10" aluminum frame hand mold having a 0.005" (127 micron) flash gap. The mold was closed and placed into a hydraulic press at a platen temperature of 140° C. A pressure of 250 psi (17.6 kg/cm$^2$) was initially applied to fill the mold. Pressure was gradually increased to 550 psi (38.7 kg/cm$^2$) over 3.5 minutes. Pressure and heat were applied for 8 minutes during which time the external mold temperature reached 115° C. for a period of at least two minutes. The mold was then platen-cooled under pressure until the external mold temperature reached about 80° C. The pressure was then released and the mold was removed and opened. The molded article was removed from the mold and the urethane foam was removed from the screw insert holes.

The resulting molded article was therefore comprised of an encapsulated particle board insert and had a molded-in edge band and molded-in screw inserts. Both the edge band and the screw inserts were integrally bonded to the molded material. The molded article showed excellent quality and represents a ready for use composite pan.

Upon evaluation, is was found that the polymerizable fraction of the molding compound permeated the insert material for a distance of up to 0.25" (0.63 cm) into the insert material. This was found to greatly enhance the impact properties of the article versus the fastening of similar sold surface material to particle board using commercial adhesives.

Example 16

Encapsulation of Thermoplastic Sheet Insert with Example 14 Composition

An insert was prepared from 0.5" thick extruded recycled PVC material. Two charges of the formulation of Example 14, each weighing 603 g, were each prepressed into a uniform thickness, circular charge about 9" in diameter. The insert was sandwiched between the charges to create a composite charge. The composite charge was placed into a room temperature 10"×10" aluminum frame hand mold having a 0.005" (127 micron) flash gap. The mold was closed and placed into a hydraulic press at a platen temperature of 140° C. A pressure of 250 psi (17.6 kg/cm$^2$) was initially applied to fill the mold. Pressure was gradually increased to 550 psi (38.7 kg/cm$^2$) at 3.5 minutes. Pressure and heat were maintained for 8 minutes during which time the external mold temperature reached 115° C. for at least two minutes. The mold was then platen cooled under pressure until the external mold temperature reached about 80° C. The pressure was then released and the mold was removed and opened. The molded article was removed from the mold and was comprised of an encapsulated PVC board insert. The molded article showed excellent quality and represents a ready for use composite part.

Example 17

Encapsulation of Nomex® Paper Sheet

A liquid mixture having components listed in Table 25 below was prepared. The liquid mixture was introduced into a water-cooled 2.5 gallon double planetary mixer (Charles Ross & Son Company; Hauppauge, N.Y.):

TABLE 25

Liquid Mixture

| Component | Parts by Weight |
|---|---|
| Acrylic sirup, 20% VO45 solids | 765 |
| Ethylene glycol dimethacrylate | 9.8 |

TABLE 25-continued

Liquid Mixture

| Component | Parts by Weight |
| --- | --- |
| Lupersol 10M75 | 2.4 |
| VAZO 67 | 0.6 |
| AOT-S | 1.0 |
| Zelec MO | 2.5 |

This liquid mixture was mixed to ensure homogeneity.

The solid materials listed in Table 26 below were premixed and introduced into the mixer:

TABLE 26

Solid Components

| Component | Parts by Weight |
| --- | --- |
| ATH-ALCAN, non-treated | 1470 |
| Kaneka FM-25 | 120 |

The mixture was mixed for 3 minutes at which point the material transformed into a paste. A mixture of decorate ATH-filled acrylic particles (DFAP's) within the size range of 30 to 150 mesh (approx. 100–560 microns) was added and mixed in:

| Component | Parts by Weight |
| --- | --- |
| DFAP's | 630 |

The mixture was mixed for 20 minutes under a 25" Hg vacuum (735 mm Hg) during which the material transformed into a thick molding compound of uniform composition. The molding compound was removed from the mixer and packaged in bulk form in an airtight plastic bag. The compound was stored at 5–10° C.

An insert was prepared from 0.004" (0.1 mm) NOMEX® paper (DuPont Company, Wilmington, Del.) stock with dimensions 9.5"×9.5". Two charges of the above formulation, each weighing 195 g, were each prepressed into a uniform thickness, circular charge about 9" in diameter. The NOMEX® insert was sandwiched between the charges to create a composite charge. The composite charge was placed into a room temperature 10"×10" aluminum frame hand mold having a 0.005" (127 micron) flash gap. The mold was closed and placed into a hydraulic press at a platen temperature of 140° C. A pressure of 550 psi (38.7 kg/cm²) was applied immediately. Pressure and heat were maintained for 6 minutes during which the external mold temperature reached 125° C. for at least two minutes. The mold was then platen-cooled under pressure until the external mold temperature reached about 80° C. The pressure was then released and the mold was removed and opened. The molded article was removed from the mold to give a sheet approximately 0.125" (0.32 cm) thick with a NOMEX® paper encapsulant suspended in the censor of the article. Adhesion between the encapsulant and the molding compound was excellent.

Example 18

Addition of Acid Functionality to Molding Compound to Promote Adhesion

A liquid mixture having the components listed in Table 27 below was prepared. The liquid mixture was introduced into a water-cooled 2.5 gallon double planetary mixer (Charles Ross & Son Company; Hauppauge, N.Y.):

TABLE 27

Liquid Mixture

| Component | Parts by Weight |
| --- | --- |
| Acrylic sirup, 17% V045 solids and 3% Elvacite 2014 solids in MMA | 762 |
| Ethylene glycol dimethacrylate | 9.8 |
| Lupersol 10M75 | 2.4 |
| VAZO 67 | 0.6 |
| Zelec MO | 2.5 |

This liquid mixture was mixed to ensure homogeneity.

The solid materials listed in Table 28 below were introduced in sequence:

TABLE 28

Solid Components

| Component | Parts by Weight |
| --- | --- |
| Calcium Carbonate (Polar Minerals) | 1890 |
| Kaneka FM-25 | 120 |
| Elvacite ® 2041 | 198 |

The mixture was mixed for 20 minutes under 25" Hg vacuum (735 mm Hg) at which point the material transformed into a thick molding compound of uniform composition. The molding compound was removed from the mixer and packaged in bulk form in an airtight plastic bag. The compound was then stored at 5–10° C.

Example 19

Encapsulation of Aluminum Shoot with Example 18 Composition

An insert was prepared from 0.125" stock aluminum sheet with dimensions 9.625"×9.625". The sheet was cleaned by sandblasting and isopropanol wash. Just prior to use, the insert was treated with a 1% Zelec® MO in isopropanol solution to enhance adhesion.

Two charges of the Example 18 Composition, each weighing 582 g, were each prepressed into a uniform thickness, circular charge about 9" in diameter. The aluminum sheet insert was sandwiched between the charges to create a composite charge.

The composite charge was placed into a room temperature 10"×10" aluminum frame hand mold having a 0.005" (127 micron) flash gap. The mold was closed and placed into a cold hydraulic press and pressed at 150 psi (10.5 kg/cm²) for about 30 seconds to fill the mold. The mold was then inserted into a second hydraulic press with a platen temperature of 140° C. A pressure of 150 psi (10.5 kg/cm²) was initially applied. Pressure was gradually increased to 550 psi (38.7 kg/cm²) within 3.0 minutes. Pressure and heat were maintained for 7.5 minutes during which time the external mold temperature reached 115° C. for at least two minutes. The mold was then platen cooled under pressure until the external mold temperature reached about 80° C. The pressure was then released and the mold was removed and opened. The molded article was removed from the mold to give a fully encapsulated aluminum sheet.

Upon evaluation, it was found that the molded article dissipated applied heat very efficiently: A five minute contact with a hot steel block (in excess of 220° C.) caused no visible damage while controls without an internal aluminum core did show irreversible heat damage.

Example 20

One-Sided Application of Example 18 Composition to Aluminum Sheet

A molding compound having Example 18 Composition, with the exception of the use of ALCAN untreated ATH, was prepared using the same procedure.

An aluminum sheet substrate identical to that in Example 16 was prepared. A single charge of molding compound weighing 420 g was prepressed into a uniform thickness, circular chase about 9" in diameter.

The molding compound was placed on the top side of the aluminum sheet and the result composite charge was placed in the mold used in Example 19 at room temperature. The mold was closed and inserted into a cold hydraulic press and pressed at about 200 psi (14 kg/cm$^2$) for 30 seconds. The mold was then inserted into a second hydraulic press win a platen temperature of 135° C. A pressure of 150 psi (10.5 kg/cm$^2$) was initially applied. Pressure was gradually increased to 550 psi (38.7 kg/cm$^2$) within 3.0 minutes. Pressure and heat were maintained for 7 minutes during which time the external mold temperature reached 120° C. for at least two minutes. The mold was then platen-cooled under pressure until the external mold temperature reached about 80° C. The pressure was then released and the mold divas removed and opened. The molded article was removed from the mold to give a two layer structure having a single sided application of filled acrylic material. Upon cooling, the part warped significantly.

Adhesion of the molded material to the aluminum substrate was found to be excellent. The interface survived many repeated impacts. Furthermore, when the composite structure was bent, the molded material cracked, but did not lose adhesion, even upon bending to 90°.

Example 21

One-Sided Application of Molding Compound to Clear Acrylic Sheet

A liquid mixture having components listed in Table 29 below was prepared. The liquid mixture was introduced into a water-cooled 2.5 gallon double planetary mixer (Charles Ross & Son Company; Hauppauge, N.Y.):

TABLE 29

| Liquid Mixture | |
| --- | --- |
| Component | Parts by Weight |
| Acrylic sirup, 24% V045 solids in MMA | 726 |
| Ethylene glycol dimethacrylate | 11 |
| Lupersol 11 | 1.5 |
| VAZO 67 | 0.6 |
| Zelec MO | 3.1 |

This liquid mature was mixed to ensure homogeneity.

The following solid materials listed in Table 30 were introduced in sequence:

TABLE 30

| Solid Components | |
| --- | --- |
| Component | Parts by Weight |
| ATH - NLM, silane-treated | 1440 |
| Zeeospheres W610 (3M Company, St. Paul, MN) | 60 |
| Elvacite ® 2896 | 120 |

The mixture was mixed for 3 minutes at which point the material transformed into a paste. A mixture of decorative ATH-filled acrylic particles (DFAP's) within the size range of 30 to 150 mesh was added and mixed in:

| Component | Parts by Weight |
| --- | --- |
| DFAP's | 690 |

The mixture was mixed for 30 minutes during which time the material formed a thick molding compound of uniform composition. The molding compound was removed from the mixer and packaged in bulk form in an airtight plastic bag. The compound was stored at 5–10° C.

An insert was prepared from 0.25" (0.64 cm) thick stock clear acrylic sheet with dimensions 7"×7". A single charge of the above molding compound weighing 425 g was prepressed into a uniform thickness, circular charge about 6" in diameter. The molding compound was placed on the top see of the acrylic sheet substrate and the resulting composite charge was placed in a room temperature, 7"×7" cavity mold similar to the mold used mold used in Example 19.

The mold was closed and inserted into a cold hydraulic press and premed at about 200 psi (14 kg/cm$^2$) for 30 seconds. The mold was then inserted into a second hydraulic press with a platen temperature of 125° C. A pressure of 530 psi (37.4 kg/cm$^2$) was initially applied. Pressure was gradually increased to 1020 psi (71.9 kg/cm$^2$) within 3.0 minutes. Pressure and heat were maintained for 7 minutes during which the external mold temperature reached 120° C. for at least three minutes. The mold was then platen cooled under pressure until the external mold temperature reached about 80° C. The pressure was then released and the mold was removed and opened. The molded article was removed from the mold to give a two layer structure having a single sided application of filled acrylic material. Upon cooler, the part showed a small amount of warp.

The resulting molded article was polished to give a very deep aesthetic. Impact testing of the acrylic sheet surface at 6, 12, 18, 36, and 80 in-lbs showed little if any damage. Impact testing of the control materials, the clear acrylic sheet or a molded plaque of the molding compound, resulted in obvious visual damage at 12 in-lbs and catastrophic failure at 80 in-lbs.

Example 22

Encapsulation of Corian® Solid Surface Material by Example 8 Composition

Corian® solid surface material, 0.25" (0.64 cm) thickness, was shattered by hammer impact. Shards of material ranging from 0.5" to 3.0" in dimension were pieced in the heated mold described in Example 8. A 400 g charge of the molding compound described in Example 8 was cold precompressed into a 8.0" diameter aisle. The charge was then placed in the heated mold, on top of the broken Corian®. The mold was closed and the molding cycle described in Example 8 was followed.

The resulting molded article was sanded to expose an interesting pattern in which the molding compound encapsulated the broken Corian® pieces to produce a continuous material.

Example 23:

Use of Complex Pressure Profile in Molding Three Dimensional Article

A liquid mixture was prepared composed of the following which was introduced into a water-cooled 2.5 gallon double planetary mixer (Charles Ross & Son Company; Hauppauge, N.Y.):

| | |
|---|---|
| Acrylic situp, 24% PMMA (part. polym. MMA) | 726 |
| Ethylene glycol dimethacrylate | 11.04 |
| Lupersol 11 | 1.5 |
| VAZO 67 | 0.6 |
| Zelec MO | 3.2 |

This liquid mixture was mixed to ensure homogeneity.

The following solid materials were then introduced into the mixer:

| | |
|---|---|
| ATH-ALCAN, non-treated | 1473 |
| Caneka FM-20 | 120 |
| Zinc Stearate | 4.5 |

The mixture was mixed for 2 minutes at which point the material transformed into paste. A mixture of decorative ATH-filled acrylic particles (DFAP's) within the size range of 2 to 150 mesh (approx. 100 microns-10.3 mm) was added and mixed in:

| | |
|---|---|
| DFAP's | 660 |

The mixture was reed for 15 minutes under 25" Hg vacuum (735 mm Hg) during which the material transformed into a thick molding compound of uniform composition. The molding compound was removed from the mixer and packaged in bulk form in an airtight plastic bag. The compound was stored at 5–10° C.

The above molding compound was evaluated in a nickel-coated aluminum, platen-heated mold which molds a 6 inch (15.2 cm) diameter flowerpot shape having a 4.5 inch (11.4 cm) depth. A toriod-shaped charge weighing 753 g was placed in the mold at a mold temperature of 22° C. The mold was placed in a hydraulic press with platens heated at 185° C., and an initial pressure of 340 psi (24 kg/cm$^2$) was applied. After 4 minutes, the external mold temperature had reached 100° C. and the pressure was increased to 1480 psi (103 kg/cm$^2$). After 6.5 minutes, the pressure was reduced to 530 psi (37.3 kg/cm$^2$). At 10 minutes, the external mold temperature had reached 128° C. and the cooling cycle was begun and the pressure was reduced and maintained at 355 psi (25 kg/cm$^2$) until demolding at 75° C.

The resulting molded article exhibited excellent reproduction of the mold cavity dimensions without pressure whitening defects on the areas which were perpendicular to the applied force during the molding cycle.

Of course, it should be understood that a wide range of changes and modifications can be made to the preferred embodiment described above. It therefore is intended that the foregoing detailed description be regarded as illustrative rather than limiting and that it be understood that it is the following claims, including all equivalents, which are intended to define the scope of this invention.

What is claimed is:

1. A molded article comprising a substrate having more than one surface and a molded component on at least a part of one surface of the substrates, wherein the substrate and the molded component can independently be either planar or shaped and the substrate is not completely encapsulated by the molded component, and wherein the substrate and the molded component can independently be either flat or shaped, and wherein the molded component is made from a molding composition comprising (a) from about 10 to about 25% by weight of a liquid polymerizable material including at least one volatile monomer reactive material, (b) at least one primary thermal initiator having a primary thermal initiator ten-hour half-life temperature, (c) at least one secondary thermal initiator having a secondary thermal initiator ten-hour half-life temperature of at least about 5C greater than the primary thermal initiator ten-hour half-life temperature, wherein at least about 0.05% by weight is one or more crosslinking agents.

2. The molded article of claim 1 wherein the substrate is selected from wood, metal, woven or nonwoven fiber mats, clear polymeric materials, filled polymeric materials, honeycomb structures, and combinations thereof.

3. The molded article of claim 2 wherein the substate is an unfilled acrylic sheet.

4. The molded article of claim 1 wherein the molded article is a molded sheet article having an upper face comprising planar molded material and a lower face comprising a planar substrate.

5. The molded article of claim 4 wherein the lower face substrate is an unfilled acrylic sheet.

6. The molded article of claim 4, wherein the article comprises a non-functional core completely encapsulated by the molding composition.

7. The molded article of claim 6 wherein the non-functional core is selected from wood, filled polymers, unfilled polymers, decorative surface materials, recycled plastics, metals, metal/plastic composites, cloth fiber mats, glass fiber mats, polyaramid fiber mats, honeycomb structures, or combinations thereof.

8. The molded article of claim 1, or wherein the article is made from at least a first charge unit and a second charge unit, the first charge unit having a molding composition that is different from a second charge unit molding composition.

* * * * *